US012428200B2

(12) United States Patent
Bazbaz

(10) Patent No.: US 12,428,200 B2
(45) **Date of Patent: *Sep. 30, 2025**

(54) EASY OPEN PLASTIC BAGS

(71) Applicant: Polytex Fibers LLC, Houston, TX (US)

(72) Inventor: Jacobo Bazbaz, Bellaire, TX (US)

(73) Assignee: Polytex Fibers LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,582

(22) Filed: Dec. 22, 2023

(65) Prior Publication Data

US 2024/0124195 A1 Apr. 18, 2024

Related U.S. Application Data

(63) Continuation of application No. 16/995,041, filed on Aug. 17, 2020, now Pat. No. 11,897,660, which is a (Continued)

(51) Int. Cl.
*B65D 33/00* (2006.01)
*B31B 70/14* (2017.01)
(Continued)

(52) U.S. Cl.
CPC ........... *B65D 33/004* (2013.01); *B65D 31/02* (2013.01); *B65D 31/04* (2013.01); *B65D 31/10* (2013.01);
(Continued)

(58) Field of Classification Search
CPC ...... B65D 33/004; B65D 31/02; B65D 31/04; B65D 31/10; B65D 75/5838; B65D 75/5844; B31B 2150/00; B31B 2170/20
See application file for complete search history.

(56) References Cited

U.S. PATENT DOCUMENTS 258,925 A 6/1882 Holmes
1,827,636 A 10/1931 Ames
(Continued)

FOREIGN PATENT DOCUMENTS

CA 2269652 A1 4/2000
DE 102004054343 A1 5/2006
(Continued)

OTHER PUBLICATIONS

U.S. Appl. No. 13/372,211, "Advisory Action", Jul. 21, 2015, 3 pages.

(Continued)

*Primary Examiner* — Derek J Battisti
(74) *Attorney, Agent, or Firm* — Kilpatrick Townsend & Stockton LLP

(57) ABSTRACT

A woven laminated plastic bag having an easy open feature is provided. The easy open feature is generally defined by a weakened portion in the bag. In various aspects the bag can be fabricated from a woven polyethylene layer which can be laminated with a polyethylene film layer, can form a pinch bottom bag, and can have one or both sides include graphics and/or printing. The bag can also provide a top end and/or a bottom end either or both of which provide a discrete area which may contain discrete graphics and/or printing.

20 Claims, 13 Drawing Sheets

Related U.S. Application Data continuation of application No. 15/435,169, filed on Feb. 16, 2017, now Pat. No. 10,766,667, which is a continuation of application No. 13/372,211, filed on Feb. 13, 2012, now Pat. No. 9,845,184.

(51) Int. Cl.

| | |
|---|---|
| ***B31B 70/81*** | (2017.01) |
| ***B31B 150/00*** | (2017.01) |
| ***B31B 170/20*** | (2017.01) |
| ***B65D 30/08*** | (2006.01) |
| ***B65D 30/20*** | (2006.01) |
| ***B65D 75/58*** | (2006.01) |

(52) U.S. Cl.
CPC ..... *B65D 75/5838* (2013.01); *B65D 75/5844* (2013.01); *B31B 70/14* (2017.08); *B31B 70/813* (2017.08); *B31B 2150/00* (2017.08); *B31B 2170/20* (2017.08)

(56) References Cited

U.S. PATENT DOCUMENTS

| | | | |
|---|---|---|---|
| 2,634,896 | A | 4/1953 | Graveno |
| 2,771,385 | A | 11/1956 | Humphner |
| 2,991,000 | A | 7/1961 | Spees |
| 3,058,647 | A | 10/1962 | Reiselt |
| 3,089,634 | A | 5/1963 | Heise et al. |
| 3,098,601 | A | 7/1963 | Anderson et al. |
| 3,159,096 | A | 12/1964 | Tocker |
| 3,203,620 | A | 8/1965 | Becker |
| 3,285,498 | A | 11/1966 | Becker, III |
| 3,369,709 | A | 2/1968 | Clauss |
| 3,508,701 | A | 4/1970 | Saito et al. |
| 3,565,328 | A | 2/1971 | Hudson |
| 3,648,922 | A | 3/1972 | Gebo |
| 3,650,460 | A | 3/1972 | Lokey |
| 3,685,720 | A | 8/1972 | Brady |
| 3,687,356 | A | 8/1972 | Goodrich et al. |
| 3,990,626 | A | 11/1976 | Goodrich |
| 4,008,850 | A | 2/1977 | Goodrich |
| 4,142,667 | A | 3/1979 | Runo |
| 4,264,659 | A | 4/1981 | Pattenden |
| 4,292,332 | A | 9/1981 | McHam |
| 4,373,979 | A | 2/1983 | Planeta |
| 4,441,613 | A | 4/1984 | Hain et al. |
| 4,460,091 | A | 7/1984 | Hain et al. |
| 4,480,752 | A | 11/1984 | Jacobs |
| 4,512,479 | A | 4/1985 | Hain et al. |
| 4,515,273 | A | 5/1985 | Jacobson et al. |
| 4,557,385 | A | 12/1985 | Robinson |
| 4,567,987 | A | 2/1986 | Lepisto et al. |
| 4,576,844 | A | 3/1986 | Murray et al. |
| 4,610,651 | A | 9/1986 | Jacobson et al. |
| 4,726,169 | A | 2/1988 | Achelpohl et al. |
| 4,739,879 | A | 4/1988 | Nakamura |
| 4,768,654 | A | 9/1988 | Jacobs |
| 4,785,940 | A | 11/1988 | Wilson |
| 4,811,849 | A | 3/1989 | Rausing |
| 4,836,378 | A | 6/1989 | Lephardt |
| 4,955,981 | A | 9/1990 | Provost |
| 5,035,328 | A | 7/1991 | Kim |
| 5,048,692 | A | 9/1991 | Handler et al. |
| 5,188,235 | A | 2/1993 | Pierce et al. |
| 5,217,307 | A | 6/1993 | McClintock |
| 5,335,788 | A | 8/1994 | Beasley et al. |
| 5,338,117 | A | 8/1994 | Kucksdorf et al. |
| 5,470,419 | A | 11/1995 | Sasaki et al. |
| 5,551,781 | A | 9/1996 | Wilkes et al. |
| 5,558,438 | A | 9/1996 | Warr |
| 5,631,068 | A | 5/1997 | Smith |
| 5,655,843 | A | 8/1997 | Conrad et al. |
| 5,679,449 | A | 10/1997 | Ebadat et al. |
| 5,830,543 | A | 11/1998 | Miyake et al. |
| 5,836,697 | A | 11/1998 | Chiesa |
| 5,855,435 | A | 1/1999 | Chiesa |
| 5,902,047 | A | 5/1999 | Yeager |
| 5,908,246 | A | 6/1999 | Arimura et al. |
| 5,938,013 | A | 8/1999 | Palumbo et al. |
| 5,979,655 | A | 11/1999 | Tseng et al. |
| 6,013,018 | A | 1/2000 | Bannister |
| 6,047,883 | A | 4/2000 | Calvert et al. |
| 6,074,095 | A | 6/2000 | Bannister et al. |
| 6,106,153 | A | 8/2000 | Toshima |
| 6,126,316 | A | 10/2000 | Bannister |
| 6,126,317 | A | 10/2000 | Anderson et al. |
| 6,224,262 | B1 | 5/2001 | Hogan et al. |
| 6,241,390 | B1 | 6/2001 | Schneck |
| 6,309,105 | B1 | 10/2001 | Palumbo |
| 6,315,448 | B1 | 11/2001 | Thrall |
| 6,328,472 | B1 | 12/2001 | Laurence et al. |
| 6,334,711 | B1 | 1/2002 | Risgalla et al. |
| 6,354,739 | B1 | 3/2002 | Sheehan, Jr. et al. |
| 6,367,976 | B1 | 4/2002 | Bannister |
| 6,431,752 | B1 | 8/2002 | Diplock |
| 6,478,465 | B1 | 11/2002 | Thrall |
| 6,609,999 | B2 | 8/2003 | Albright |
| 6,635,711 | B1 | 10/2003 | Miskovic et al. |
| 6,659,644 | B2 | 12/2003 | Gebhardt |
| 6,698,928 | B2 | 3/2004 | Miller |
| 6,800,051 | B2 | 10/2004 | Koehn |
| 6,966,134 | B2 | 11/2005 | Ngan |
| 6,979,482 | B2 | 12/2005 | Hartzell et al. |
| 7,090,904 | B2 | 8/2006 | Hartzell et al. |
| 7,165,887 | B2 | 1/2007 | Strand et al. |
| 7,237,953 | B2 | 7/2007 | Healy et al. |
| 7,311,442 | B1 | 12/2007 | Moravek |
| 7,523,825 | B2 | 4/2009 | Velazquez et al. |
| 7,563,027 | B2 | 7/2009 | Allen et al. |
| 7,597,480 | B2 | 10/2009 | Kuge et al. |
| 7,722,255 | B2 | 5/2010 | Tessera Chiesa |
| 7,731,425 | B2 | 6/2010 | Lin et al. |
| 7,753,588 | B2 | 7/2010 | Bazbaz |
| 8,173,233 | B2 | 5/2012 | Rogers et al. |
| 8,221,062 | B2 | 7/2012 | Liotta et al. |
| 8,227,062 | B2 | 7/2012 | Nowak et al. |
| 8,240,915 | B2 | 8/2012 | Sargin et al. |
| 8,241,193 | B2 | 8/2012 | Jansen |
| 8,241,194 | B2 | 8/2012 | Skopek et al. |
| 8,297,840 | B2 | 10/2012 | Jansen |
| 8,309,192 | B2 | 11/2012 | Meseguer Huertas |
| 8,443,578 | B2 | 5/2013 | Sargin et al. |
| 8,475,046 | B2 | 7/2013 | Jansen |
| 8,535,209 | B2 | 9/2013 | Sargin |
| 8,540,427 | B2 | 9/2013 | Steele |
| 8,613,547 | B2 | 12/2013 | Steele |
| 8,753,012 | B2 | 6/2014 | Files et al. |
| 9,073,281 | B2 | 7/2015 | Sargin |
| 9,233,502 | B2 | 1/2016 | Sargin et al. |
| 9,669,981 | B2 | 6/2017 | Bazbaz |
| 9,669,983 | B2 | 6/2017 | Bazbaz et al. |
| 9,731,868 | B2 | 8/2017 | Bazbaz |
| 9,809,354 | B2 | 11/2017 | Brauer et al. |
| 9,845,184 | B2 | 12/2017 | Bazbaz |
| 9,926,106 | B2 | 3/2018 | Bazbaz et al. |
| 9,926,107 | B2 | 3/2018 | Koesters et al. |
| 9,969,529 | B2 | 5/2018 | Bazbaz |
| 10,183,796 | B2 | 1/2019 | Kruse et al. |
| 10,562,689 | B2 | 2/2020 | Bazbaz et al. |
| 10,569,933 | B2 | 2/2020 | Koesters |
| 10,661,963 | B2 | 5/2020 | Bazbaz et al. |
| 10,759,585 | B2 | 9/2020 | Bazbaz et al. |
| 10,766,667 | B2 | 9/2020 | Bazbaz |
| 10,913,587 | B2 | 2/2021 | Bazbaz |
| 11,027,888 | B2 | 6/2021 | Bazbaz |
| 11,066,212 | B2 | 7/2021 | Bazbaz |
| 11,897,660 | B2 | 2/2024 | Bazbaz |
| 2002/0119292 | A1 | 8/2002 | Venkatasanthanam et al. |
| 2003/0040411 | A1 | 2/2003 | Albright |
| 2003/0139516 | A1 | 7/2003 | Quinn et al. |
| 2003/0152299 | A1 | 8/2003 | Culbertson et al. |
| 2003/0228077 | A1 | 12/2003 | Laske |
| 2004/0091648 | A1 | 5/2004 | Hartzell et al. |

(56) References Cited

U.S. PATENT DOCUMENTS

| | | | |
|---|---|---|---|
| 2004/0114838 A1 | 6/2004 | McGregor | |
| 2004/0184680 A1 | 9/2004 | Dematteis et al. | |
| 2005/0036716 A1 | 2/2005 | Geyer | |
| 2005/0084185 A1 | 4/2005 | Moon | |
| 2005/0087542 A1 | 4/2005 | Bazbaz | |
| 2005/0226542 A1 | 10/2005 | Kendall et al. | |
| 2006/0045392 A1 | 3/2006 | Bannister et al. | |
| 2006/0072856 A1 | 4/2006 | Su et al. | |
| 2006/0198561 A1 | 9/2006 | Cornelisse | |
| 2006/0215942 A1 | 9/2006 | Steele | |
| 2006/0285777 A1 | 12/2006 | Howell et al. | |
| 2006/0285781 A1 | 12/2006 | Zoss | |
| 2007/0047852 A1 | 3/2007 | Sharp et al. | |
| 2007/0047853 A1 | 3/2007 | Sharp et al. | |
| 2007/0082158 A1 | 4/2007 | Nowak | |
| 2007/0104905 A1* | 5/2007 | Floyd | B60R 21/235 428/36.1 |
| 2007/0140600 A1 | 6/2007 | Nowak et al. | |
| 2007/0292053 A1 | 12/2007 | Lin et al. | |
| 2008/0047228 A1 | 2/2008 | Anzini et al. | |
| 2008/0144979 A1 | 6/2008 | Capt et al. | |
| 2008/0187695 A1 | 8/2008 | Nowak et al. | |
| 2008/0292223 A1 | 11/2008 | Bannister | |
| 2009/0080813 A1 | 3/2009 | Rasmussen et al. | |
| 2009/0136161 A1 | 5/2009 | Hickey | |
| 2009/0136163 A1 | 5/2009 | Kerr et al. | |
| 2009/0148081 A1* | 6/2009 | Rogers | B65D 33/24 383/203 |
| 2009/0159192 A1 | 6/2009 | Bannister | |
| 2009/0245699 A1 | 10/2009 | Steele | |
| 2009/0263048 A1 | 10/2009 | Iannelli, II et al. | |
| 2009/0317578 A1 | 12/2009 | Rogers et al. | |
| 2009/0324143 A1 | 12/2009 | Sharp et al. | |
| 2010/0002964 A1 | 1/2010 | Yeager et al. | |
| 2010/0029455 A1 | 2/2010 | Skopek et al. | |
| 2010/0154362 A1 | 6/2010 | Jansen | |
| 2010/0158417 A1 | 6/2010 | Sharp et al. | |
| 2010/0158418 A1 | 6/2010 | Jansen | |
| 2010/0189380 A1 | 7/2010 | Sargin et al. | |
| 2010/0209026 A1* | 8/2010 | Koenigkramer | B65D 33/1691 383/105 |
| 2010/0266223 A1 | 10/2010 | Lin et al. | |
| 2010/0270309 A1 | 10/2010 | Files et al. | |
| 2010/0278454 A1 | 11/2010 | Huffer | |
| 2010/0293897 A1 | 11/2010 | Jansen | |
| 2011/0002560 A1 | 1/2011 | Robles et al. | |
| 2011/0019944 A1 | 1/2011 | Sargin | |
| 2011/0026855 A1 | 2/2011 | Fuller | |
| 2011/0038569 A1 | 2/2011 | Huffer et al. | |
| 2011/0082019 A1 | 4/2011 | Bannister | |
| 2011/0103721 A1 | 5/2011 | Sargin et al. | |
| 2011/0139865 A1 | 6/2011 | Raeth et al. | |
| 2011/0147383 A1 | 6/2011 | Soudais et al. | |
| 2011/0255807 A1 | 10/2011 | Shapiro et al. | |
| 2011/0263400 A1 | 10/2011 | Sargin | |
| 2012/0314979 A1* | 12/2012 | Heininga | B65D 31/10 383/42 |
| 2012/0321229 A1 | 12/2012 | Surdziel et al. | |
| 2013/0016926 A1 | 1/2013 | Koehn et al. | |
| 2013/0022295 A1 | 1/2013 | Shapiro et al. | |
| 2013/0047555 A1 | 2/2013 | Jansen | |
| 2013/0102449 A1 | 4/2013 | Graboski et al. | |
| 2013/0142455 A1 | 6/2013 | Forman et al. | |
| 2013/0206631 A1 | 8/2013 | Bazbaz | |
| 2013/0209002 A1 | 8/2013 | Bazbaz | |
| 2013/0279833 A1 | 10/2013 | Wallander | |
| 2013/0330028 A1 | 12/2013 | Bannister et al. | |
| 2014/0090339 A1 | 4/2014 | Sargin | |
| 2014/0105523 A1 | 4/2014 | Bazbaz | |
| 2014/0342114 A1 | 11/2014 | Beard | |
| 2014/0360669 A1 | 12/2014 | Schnaars, Sr. et al. | |
| 2015/0183194 A1 | 7/2015 | Lehmann et al. | |
| 2015/0266644 A1 | 9/2015 | Bazbaz | |
| 2015/0284164 A1 | 10/2015 | Bazbaz et al. | |
| 2020/0148423 A1 | 5/2020 | Koesters | |
| 2020/0189248 A1 | 6/2020 | Koesters et al. | |
| 2020/0307171 A1 | 10/2020 | Koesters | |
| 2021/0047096 A1 | 2/2021 | Obermann et al. | |

FOREIGN PATENT DOCUMENTS

| | | | |
|---|---|---|---|
| EP | 1035028 | A1 | 9/2000 |
| EP | 1046591 | A2 | 10/2000 |
| EP | 1035028 | B1 | 12/2002 |
| EP | 1433711 | A1 | 6/2004 |
| EP | 1468931 | A1 | 10/2004 |
| EP | 1595815 | A1 | 11/2005 |
| EP | 1780136 | A1 | 5/2007 |
| EP | 2263949 | A1 | 12/2010 |
| EP | 2599617 | A2 | 6/2013 |
| EP | 2987744 | B1 | 7/2017 |
| FR | 1207899 | A | 2/1960 |
| FR | 1278226 | A | 12/1961 |
| WO | 9118377 | A2 | 11/1991 |
| WO | 9961344 | A1 | 12/1999 |
| WO | 0002782 | A2 | 1/2000 |
| WO | 03040411 | A1 | 5/2003 |
| WO | 2005030600 | A1 | 4/2005 |
| WO | 2008146142 | A1 | 12/2008 |
| WO | 2008157681 | A1 | 12/2008 |
| WO | 2009016644 | A1 | 2/2009 |
| WO | 2009082712 | A1 | 7/2009 |
| WO | 2010093501 | A1 | 8/2010 |
| WO | 2012040097 | A2 | 3/2012 |
| WO | 2012141981 | A1 | 10/2012 |
| WO | 2013123015 | A1 | 8/2013 |
| WO | 2014059283 | A1 | 4/2014 |
| WO | 2015103103 | A1 | 7/2015 |

OTHER PUBLICATIONS

U.S. Appl. No. 13/372,211, "Advisory Action", Sep. 15, 2016, 3 pages.
U.S. Appl. No. 13/372,211, "Final Office Action", Jul. 1, 2016, 15 pages.
U.S. Appl. No. 13/372,211, "Final Office Action", Mar. 31, 2016, 14 pages.
U.S. Appl. No. 13/372,211, "Final Office Action", May 13, 2015, 18 pages.
U.S. Appl. No. 13/372,211, "Non-Final Office Action", Aug. 25, 2014, 17 pages.
U.S. Appl. No. 13/372,211, "Non-Final Office Action", Jan. 27, 2014, 17 pages.
U.S. Appl. No. 13/372,211, "Non-Final Office Action", Mar. 20, 2017, 5 pages.
U.S. Appl. No. 13/372,211, "Non-Final Office Action", Oct. 14, 2015, 14 pages.
U.S. Appl. No. 13/372,211, "Notice of Allowance", Oct. 25, 2017, 2 pages.
U.S. Appl. No. 13/372,211, "Notice of Allowance", Sep. 27, 2017, 5 pages.
U.S. Appl. No. 13/372,211, Easy Open Plastic Bags, Feb. 13, 2012, 39 pages.
U.S. Appl. No. 13/441,358, Apr. 6, 2012, 32 pages.
U.S. Appl. No. 13/682,289, "Final Office Action", Jun. 7, 2016, 14 pages.
U.S. Appl. No. 13/682,289, "Non-Final Office Action", Mar. 21, 2017, 5 pages.
U.S. Appl. No. 13/682,289, "Non-Final Office Action", Oct. 16, 2015, 14 pages.
U.S. Appl. No. 13/682,289, "Notice of Allowability", Apr. 20, 2018, 2 pages.
U.S. Appl. No. 13/682,289, "Notice of Allowability", Jan. 24, 2018, 2 pages.
U.S. Appl. No. 13/682,289, "Notice of Allowability", Jan. 8, 2018, 4 pages.
U.S. Appl. No. 13/682,289, "Notice of Allowance", Dec. 26, 2017, 7 pages.

(56) References Cited

OTHER PUBLICATIONS

U.S. Appl. No. 13/682,289, "Notice of Allowance", Mar. 29, 2018, 2 pages.
U.S. Appl. No. 13/682,289, Nov. 20, 2012, 48 pages.
U.S. Appl. No. 14/051,965, Polymeric Bags With Easy Access Features Attached to the Bags Without Adhesives, Oct. 11, 2013, 39 pages.
U.S. Appl. No. 14/085,094, Methods of Sealing Plastic Bags and Plastic Bags Made by the Methods, Nov. 20, 2013, 13 pages.
U.S. Appl. No. 14/610,904, "Advisory Action", Sep. 1, 2016, 3 pages.
U.S. Appl. No. 14/610,904, "Corrected Notice of Allowability", Feb. 13, 2017, 4 pages.
U.S. Appl. No. 14/610,904, "Non-Final Office Action", May 27, 2016, 14 pages.
U.S. Appl. No. 14/610,904, "Non-Final Office Action", Oct. 21, 2015, 14 pages.
U.S. Appl. No. 14/610,904, "Notice of Allowability", Apr. 24, 2017, 2 pages.
U.S. Appl. No. 14/610,904, "Notice of Allowance", Jan. 23, 2017, 7 pages.
U.S. Appl. No. 14/678,641, "Advisory Action", Sep. 1, 2016, 2 pages.
U.S. Appl. No. 14/678,641, "Final Office Action", Jun. 3, 2016, 15 pages.
U.S. Appl. No. 14/678,641, "Non-Final Office Action", Nov. 25, 2015, 12 pages.
U.S. Appl. No. 14/678,641, "Notice of Allowability", Apr. 20, 2017, 2 pages.
U.S. Appl. No. 14/678,641, "Notice of Allowance", Feb. 3, 2017, 8 pages.
U.S. Appl. No. 15/189,814, "Advisory Action", Apr. 9, 2020, 3 pages.
U.S. Appl. No. 15/189,814, "Final Office Action", Jan. 30, 2020, 36 pages.
U.S. Appl. No. 15/189,814, "Final Office Action", May 10, 2019, 30 pages.
U.S. Appl. No. 15/189,814, "Non-Final Office Action", Aug. 1, 2019, 31 pages.
U.S. Appl. No. 15/189,814, "Non-Final Office Action", May 19, 2020, 25 pages.
U.S. Appl. No. 15/189,814, "Non-Final Office Action", Oct. 1, 2018, 23 pages.
U.S. Appl. No. 15/189,814, "Notice of Allowance", Mar. 31, 2021, 12 pages.
U.S. Appl. No. 15/435,169, "Advisory Action", Jun. 18, 2019, 2 pages.
U.S. Appl. No. 15/435,169, "Advisory Action", Mar. 2, 2020, 2 pages.
U.S. Appl. No. 15/435,169, "Corrected Notice of Allowability", Jul. 16, 2020, 2 pages.
U.S. Appl. No. 15/435,169, "Final Office Action", Dec. 26, 2019, 9 pages.
U.S. Appl. No. 15/435,169, "Final Office Action", Mar. 15, 2019, 11 pages.
U.S. Appl. No. 15/435,169, "Non-Final Office Action", Aug. 28, 2019, 10 pages.
U.S. Appl. No. 15/435,169, "Non-Final Office Action", Sep. 14, 2018, 12 pages.
U.S. Appl. No. 15/435,169, "Notice of Allowance", Jul. 30, 2020, 3 pages.
U.S. Appl. No. 15/435,169 , "Notice of Allowance", May 7, 2020, 8 pages.
U.S. Appl. No. 15/440,970 , "Advisory Action", Jun. 4, 2019, 2 pages.
U.S. Appl. No. 15/440,970 , "Corrected Notice of Allowability", Jul. 30, 2020, 2 pages.
U.S. Appl. No. 15/440,970 , "Final Office Action", Mar. 15, 2019, 11 pages.
U.S. Appl. No. 15/440,970 , "Non-Final Office Action", Oct. 25, 2019, 10 pages.
U.S. Appl. No. 15/440,970 , "Non-Final Office Action", Sep. 10, 2018, 9 pages.
U.S. Appl. No. 15/440,970 , "Notice of Allowance", Apr. 27, 2020, 5 pages.
U.S. Appl. No. 15/495,772 , "Advisory Action", Jul. 8, 2019, 3 pages.
U.S. Appl. No. 15/495,772 , "Final Office Action", Mar. 23, 2020, 16 pages.
U.S. Appl. No. 15/495,772 , "Final Office Action", Apr. 24, 2019, 9 pages.
U.S. Appl. No. 15/495,772 , "Non-Final Office Action", Oct. 17, 2018, 12 pages.
U.S. Appl. No. 15/495,772 , "Non-Final Office Action", Aug. 29, 2019, 9 pages.
U.S. Appl. No. 15/495,772 , "Notice of Allowance", Oct. 23, 2020, 5 pages.
U.S. Appl. No. 15/495,772 , "Notice of Allowance", Jun. 26, 2020, 9 pages.
U.S. Appl. No. 15/621,850 , "Non-Final Office Action", Mar. 18, 2019, 12 pages.
U.S. Appl. No. 15/621,850 , "Notice of Allowance", Oct. 17, 2019, 5 pages.
U.S. Appl. No. 15/811,101 , "Advisory Action", Dec. 16, 2019, 3 pages.
U.S. Appl. No. 15/811,101 , "Final Office Action", Sep. 13, 2019, 16 pages.
U.S. Appl. No. 15/811,101 , "Non-Final Office Action", Mar. 20, 2019, 13 pages.
U.S. Appl. No. 15/866,354 , "Advisory Action", Nov. 12, 2019, 3 pages.
U.S. Appl. No. 15/866,354 , "Final Office Action", Sep. 5, 2019, 20 pages.
U.S. Appl. No. 15/866,354 , "Non-Final Office Action", May 28, 2019, 16 pages.
U.S. Appl. No. 15/866,354 , "Notice of Allowance", Jan. 15, 2020, 8 pages.
U.S. Appl. No. 15/933,156 , "Corrected Notice of Allowance", Sep. 23, 2020, 5 pages.
U.S. Appl. No. 15/933,156 , "Non-Final Office Action", Mar. 9, 2020, 11 pages.
U.S. Appl. No. 15/933,156 , "Notice of Allowability", May 13, 2021, 2 pages.
U.S. Appl. No. 15/933,156 , "Notice of Allowance", Feb. 17, 2021, 5 pages.
U.S. Appl. No. 15/933,156 , "Notice of Allowance", Sep. 15, 2020, 7 pages.
U.S. Appl. No. 16/228,282 , "Non-Final Office Action", Apr. 28, 2020, 28 pages.
U.S. Appl. No. 16/228,282 , "Notice of Allowance", Oct. 28, 2020, 8 pages.
U.S. Appl. No. 16/847,473 , "Non-Final Office Action", Jan. 14, 2021, 16 pages.
U.S. Appl. No. 16/995,041 , "Corrected Notice of Allowability", Oct. 17, 2023, 2 pages.
U.S. Appl. No. 16/995,041 , "Final Office Action", Mar. 3, 2023, 13 pages.
U.S. Appl. No. 16/995,041 , "Non-Final Office Action", Apr. 7, 2022, 13 pages.
U.S. Appl. No. 16/995,041 , "Non-Final Office Action", Aug. 16, 2022, 14 pages.
U.S. Appl. No. 16/995,041 , "Notice of Allowance", Sep. 21, 2023, 12 pages.
U.S. Appl. No. 61/713,323 , Polymeric Bags With Easy Access Features Attached to the Bags Without Adhesives, Oct. 12, 2012, 30 pages.
U.S. Appl. No. 61/728,334 , Methods of Sealing Plastic Bags and Plastic Bags Made by the Methods, Nov. 20, 2012, 13 pages.
U.S. Appl. No. 61/755,322 , Easy Access Woven Plastic Bags, Jan. 22, 2013, 28 pages.
U.S. Appl. No. 61/755,326 , Easy Access Non-Woven Plastic Bags, Jan. 22, 2013, 28 pages.

(56) References Cited

OTHER PUBLICATIONS

CA3,036,607 , "Notice of Allowance", Jul. 30, 2020, 1 page.
DE102004054343 , "Machine Translation of German Application No.", May 11, 2006, 1 page.
EP13706855.7 , "Notice of Decision to Grant", Oct. 19, 2017, 2 pages.
EP13706855.7 , "Office Action", Aug. 1, 2016, 6 pages.
EP17199258.9 , "Extended European Search Report", Jan. 22, 2018, 9 pages.
EP17199258.9 , "Intention to Grant", Mar. 17, 2023, 8 pages.
EP17199258.9 , "Office Action", Aug. 3, 2020, 4 pages.
EP17199258.9 , "Office Action", Mar. 9, 2022, 4 pages.
EP17199258.9 , "Office Action", Sep. 23, 2022, 4 pages.
EP17199258.9 , "Office Action", Jan. 10, 2020, 5 pages.
EP17813957.2 , "Extended European Search Report", Nov. 27, 2019, 8 pages.
EP17813957.2 , "Office Action", Oct. 9, 2020, 4 pages.
EP18757991.7 , "Extended European Search Report", Nov. 16, 2020, 10 pages.
EP23185491.0 , "Extended European Search Report", Nov. 3, 2023, 5 pages.
EP23185491.0 , "Intention to Grant", Apr. 19, 2024, 7 pages.
MX/A/2016/013051 , "Office Action", Aug. 4, 2020, 4 pages.
MX/A/2019/000663 , "Notice of Allowance", Jul. 12, 2022, 3 pages.
MX/A/2019/000663 , "Office Action", Apr. 27, 2022, 4 pages.
PCT/US2012/032520 , "International Search Report and Written Opinion", Jul. 16, 2012, 10 pages.
PCT/US2013/025891 , "International Search Report and Written Opinion", Apr. 29, 2013, 10 pages.
PCT/US2013/064555 , "International Search Report and Written Opinion", Jan. 3, 2014, 8 pages.
PCT/US2018/019054 , "International Search Report and Written Opinion", Jun. 20, 2018, 17 pages.
PCT/US2018/066893 , "International Preliminary Report on Patentability", Jul. 23, 2020, 9 pages.
PCT/US2018/066893 , "International Search Report and Written Opinion", Feb. 28, 2019, 10 pages.

* cited by examiner

EASY OPEN PLASTIC BAGS

CROSS-REFERENCE TO RELATED APPLICATIONS

This application is a continuation of and claims priority to U.S. application Ser. No. 16/995,041 filed on Aug. 17, 2020 and titled "EASY OPEN PLASTIC BAGS;" which is a continuation of and claims the priority to U.S. application Ser. No. 15/435,169 filed on Feb. 16, 2017 and titled "EASY OPEN PLASTIC BAGS," now U.S. Pat. No. 10,766,667 issued on Sep. 8, 2020; which is a continuation of and claims priority to U.S. patent application Ser. No. 13/372,211, filed on Feb. 13, 2012 and titled "EASY OPEN PLASTIC BAGS," now U.S. Pat. No. 9,845,184 issued on Dec. 19, 2017; the contents of each of which are herein incorporated by reference in their entireties for all purposes.

BACKGROUND OF THE INVENTION

1. Field of the Invention

The present disclosure relates to plastic bags with improved opening features.

2. Background of the Invention

Conventional plastic bags of a wide variety of size and shape are used in various situations. Bulk materials, such as flour, sugar, rice, seed, animal feed, chemicals, powdered materials or the like, for example, typically have been packaged in woven plastic bags in the past. Pet food, bird seed and other products sold in retail stores typically have not been packaged in conventional woven plastic bags. Among other reasons for this, woven plastic bags were considered too rudimentary to be printed with high end graphics suitable for consumer type of packaging. In addition, the high speed requirements in the filling and packaging operations limited the use of the woven bags in these applications.

Laminated woven sacks (LWS) were developed using a woven polypropylene structure laminated to a bi-oriented polypropylene film (BOPP) that can be reverse printed with high end graphics suitable for consumer type of packaging. The LWS provides a stronger, more attractive bag than the more conventional multiwall bags used for that purpose over the last 20 years. Due to their tough strong structure, conventional LWS bags are typically sewn shut on both ends. These LWS recently met with success and have been successfully substituted for the conventional multiwall paper bags used in the pet food industry for many years.

One major drawback of the sewn LWS has been the closing of the bags at high speed filling lines, such as those for filling such bags with pet food. Experience has shown that sewing production lines are typically slower than the filling of the multiwall pinch bottom bags. Additionally, the sewn bags do not provide an aesthetically pleasing and useful clean display on the ends of the bags, thus making it difficult for consumers to identify or find a desired brand quickly when the bags are displayed on the shelves at the point of sale, such as when they are stacked on top of one another. In addition, the sewn ends required puncturing the plastic bags and thus result in a bag that is not sealed, leading to somewhat reduced shelf-life and possible infestation of the contents of the bag. Thus, there is a need for pinch laminated woven sacks that overcome these drawbacks in the filling and closing operations while allowing an attractive graphic display of the bags' ends at the retail outlet and also providing a strong, durable bag which remains sealed.

One major disadvantage of the newly developed pinch bottom laminated woven sack, however, is that it does not include an easy open feature that allows the consumer or purchaser to quickly and easily open the bag without the use of scissors or knives. There is a need for such a pinch bottom laminated woven sack which is easy to open without the use of scissors, knives or other such instruments, and also does not require the use of excessive force.

Woven plastic bags have been used and are conventional for certain applications. An example of a conventional woven plastic bag is provided in U.S. Pat. No. 4,373,979 ("the '979 patent"), issued on Feb. 15, 1983. The '979 patent describes the use of woven strips of highly longitudinally-oriented, high-density polyethylene or polypropylene in a bag construction in which the bag is formed from a seamed tube made of the woven plastic material. The seamed tube has gussets on either side and, when a portion is cut from the rest of the tube, a bag having two open, unsealed ends is provided. The '979 patent describes the use of ultrasonic spot welds to seal portions of a bag made of such woven plastic strips, as opposed to sewing the seams of a bag or using a hot melt adhesive to seal the gusset forming pleat. The '979 patent is hereby incorporated by reference herein. The '979 patent purports to be an improvement for sealing a plastic bag. As noted in the '979 patent, sewing one end tends to take longer, thus adding time to the manufacturing process. In addition, the sewn ends in a conventional bag tend to be a weak portion of the bag, and a likely location for rips, tearing, and subsequent loss of contents during storing, shipping and handling. In addition, such bags may not provide sufficient protection from infestation from vermin and/or insects.

Another example of plastic bags is disclosed in U.S. Patent Application Publication Number US 2010/0029455 A1 ("the '455 publication"), published on Feb. 4, 2010, which describes production of web sections from a flexible web material that is provided with tear-off lines produced by laser beam processing at the distance of the length of the web sections to be formed. The tear-off lines weaken the flexible web material, but do not result in complete separation of the web sections from the web material, which occurs upon tearing the flexible web material. The '455 publication is incorporated by reference herein.

More recently, some types of plastic bags have provided improvements in sealing the ends of the bags. For example, in U.S. Pat. No. 6,800,051 B2 ("the '051 patent"), issued on Oct. 5, 2004, a process for sealing side fold sacks made of plastic film is described. According to the '051 patent, a web of plastic tubular film is cut to provide a staggered detachment along a perforation so that one wall (e.g., the front wall) projects beyond the opposing wall (e.g., the back wall). The projecting portion of the first wall is then folded over and sealed to the opposing wall by means of a plastic adhesive such as a polyurethane adhesive or hot melt. The '051 patent is hereby incorporated by reference herein. However, such bags involve plastic films, not woven plastic materials, and therefore are unable to handle the weight loads of conventional bulk bags made of paper and other materials. Such bags are useful for only certain lightweight contents, such as bread.

There are a variety of conventional ways of providing for reusable openings in bags. For example, U.S. Pat. No. 6,478,465 B1 ("the '465 patent"), issued Nov. 12, 2002, describes a peelable opening in a multiwall, pinched bottom open mouth bag construction. The '465 patent also describes the use of an adhesive layer that can be used so that the bag opening is reclosable. The '465 patent is hereby incorporated by reference herein.

In other types of conventional plastic bags, such as those used in retail and grocery stores, the use of weakened portion provided by one or more perforations in the plastic bag wall is known. A number of approaches have been taken in connection with such bags, including those shown in U.S. Pat. No. 5,188,235 (the '235 patent), issued Feb. 23, 1993, as well as in U.S. Published Patent Application No. 2005/0087542 A1 (the '542 application), published Apr. 28, 2005, U.S. Pat. No. 5,979,655 (the '655 patent), issued Nov. 9, 1999, and U.S. Published Patent Application No. 2006/0072856 (the '856 application), issued Apr. 6, 2006. However, none of these bags are woven bags, let alone bags with multiple layers. The '235 patent, the '655 patent, the '542 application, and the '856 application are hereby incorporated by reference.

Typically, woven and non-woven bags are sealed with a single or double fold at each end with tape over the single or double fold, stitching at both ends, or a zipper at one end and a single or double fold at the other end. However, opening woven and certain non-woven bags has proven difficult, due to the strength of the bag. Therefore, what is needed are woven and non-woven bags that are easier to open, that do not add much to the cost or time to manufacture, and are not susceptible to inadvertent tearing, punctures, breaking, or the like.

SUMMARY OF THE INVENTION

The present disclosure provides woven and non-woven plastic bags comprising an easy open feature, which makes the presently disclosed woven and non-woven plastic bags easier to open than conventional woven and non-woven plastic bags.

The present disclosure provides a bag comprising a front wall, a back wall, an interior surface, an exterior surface, a top end, a bottom end, a first layer and a second layer, each of the front wall and back wall having an interior surface, an exterior surface, a top end and a bottom end, wherein the first layer comprises a polymer and the second layer comprises a polymer attached to the first layer, and wherein the bag comprises an easy open feature located on the front wall of the bag, the back wall of the bag, or a combination thereof. The first layer can comprise a woven polymer, including, but not limited to, polypropylene, high density polyethylene, low density polyethylene, polyester, or any combination thereof. The second layer can comprise a polymeric film, including, but not limited to, polypropylene, polyethylene, polyethylene terephthalate, polyamide, or any combination thereof, or paper or coated paper portion suitable for having high quality print graphics thereon, or a combination of a polymeric film and a paper portion suitable for having high quality print graphics thereon. The second layer can alternatively comprise an oriented polymeric film, including, but not limited to, oriented polypropylene, biaxially-oriented polypropylene, oriented polyethylene, biaxially-oriented polyethylene, oriented polyethylene terephthalate, biaxially-oriented polyethylene terephthalate, oriented polyamide, biaxially-oriented polyamide, or any combination thereof. The first layer and second layer can be laminated together. Thus, in certain aspects the first layer can consist or consist essentially of a woven polymer and the second layer can consist or consist essentially of a film.

In general, the easy open feature comprises a weakened area. The weakened area can comprise a cut having a first end and a second end, wherein the cut penetrates through at least a portion of the front wall of the bag, the back wall of the bag, or a combination thereof. In certain aspects the cut can comprise a line or an open shape, including, but not limited to, a carat, a semi-circle, an open square, or an open rectangle. The weakened area can further comprise a plurality of perforations extending from the first end or the second end of the cut, wherein the plurality of perforations penetrate through at least a portion of the front wall of the bag, the back wall of the bag, or a combination thereof. In various aspects the plurality of perforations extends about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the front wall of the bag, the back wall of the bag, or a combination thereof. In certain embodiments the plurality of perforations extends from the first end of the cut to the second end of the cut. The plurality of perforations can extend around one or more walls of the bag, or can alternatively extend to form a shape, including, but not limited to, a circle, a triangle, a square or a rectangle. The shape can be comprised on a single wall of the bag, or can extend over contiguous walls of the bag. Further, a plurality of perforations can extend from the first end of the cut and a plurality of perforations can extend from the second end of the cut. The plurality of perforations can extend from the first end of the cut and the second end of the cut about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the front wall of the bag, the back wall of the bag, or a combination thereof, or can extend to form a shape, including, but not limited to, a circle, a triangle, a square or a rectangle. Once again, the shape can be comprised on a single wall of the bag, or can extend over contiguous walls of the bag.

The weakened area can also comprise a first cut having a first end and a second end and a second cut having a first end and a second end. In particular embodiments the first cut and the second cut intersect, for example comprising an "X" shape, or the first cut and the second cut comprise parallel lines. The weakened area can additionally comprise a third cut, and the first cut, the second cut and the third cut are connected, for example wherein the first cut, the second cut and the third cut comprise an "H" shape (or a sideways "H" shape when viewing the bag with the top end of the bag up). The weakened area can further comprise a plurality of perforations extending from the first end and the second end of the first cut, and a plurality of perforations extending from the first end and the second end of the second cut, wherein the plurality of perforations penetrate through at least a portion of the front wall of the bag, the back wall of the bag, or a combination thereof. The plurality of perforations extending from the first end and the second end of the first cut and the plurality of perforations extending from the first end and the second end of the second cut can comprise parallel lines or lines that intersect. In various embodiments the plurality of perforations can extending from the first end and the second end of the first cut and the first end and the second end of the second cut about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the front wall of the bag, the back wall of the bag, or a combination thereof.

The weakened area can alternatively comprise a plurality of perforations that penetrate through at least a portion of the front wall of the bag, the back wall of the bag, or a combination thereof. The plurality of perforations can form a line that extends about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the front wall of the bag, the back wall of the bag, or a combination thereof. The plurality of perforations can also form a shape, including, but not limited to, a circle, an oval, a triangle, a square or a rectangle. In other aspects, the plurality of perforations forms a first line and a second line, which can be about parallel and extend about 5%, about 10%, about 15%, about 20%, about 25%, about 30%, about 35%, about 40%, about 45%, about 50%, about 55%, about 60%, about 65%, about 70%, about 75%, about 80%, about 85%, about 90%, about 95% or about 99% of a distance across the front wall of the bag, the back wall of the bag, or a combination thereof. Furthermore, the weakened area can comprise a deformation in least a portion of the front wall of the bag, the back wall of the bag, or a combination thereof. For example, the weakened area can comprise a scoring mark.

The easy open feature can be comprised within the first layer or the second layer of the bag, or within the first layer and the second layer of the bag. The bag can further comprise an adhesive pull tab covering at least a portion of the easy open feature or the entire easy open feature. The adhesive pull tab can comprise a piece of tape, and can also comprise printing, for example directions for opening the easy open feature or a promotional coupon.

In certain embodiments the bottom end of the bag is sealed using conventional means. For example, at least a portion of a single fold of the bottom end of the front wall and the rear wall of the bag can be sealed to the outer surface of the front wall or rear wall of the bag, using an adhesive sealing, heat sealing, adhesive lamination, extrusion lamination, stitching, ultrasonic energy, pressure, tape, or any combination thereof. Alternatively, at least a portion of a double fold of the bottom end of the front wall and the rear wall of the bag can be sealed to the outer surface of the front wall or rear wall of the bag. However, in certain aspects at least a portion of the bottom end of the rear wall, or the entire bottom end of the rear wall, projects further than the bottom end of the front wall. Thus, the portion of the bottom end of the rear wall that projects further than the bottom end of the front wall can be sealed to the outer surface of the bottom end of the front wall. Additionally, the top end of the bag can be sealed using conventional means. For example, at least a portion of a single fold of the top end of the front wall and the rear wall of the bag can be sealed to the outer surface of the front wall or rear wall of the bag, using an adhesive sealing, heat sealing, adhesive lamination, extrusion lamination, stitching, ultrasonic energy, pressure, tape, or any combination thereof. Alternatively, at least a portion of a double fold of the top end of the front wall and the rear wall of the bag can be sealed to the outer surface of the front wall or the rear wall of the bag. However, in certain aspects at least a portion of the top end of the rear wall, or the entire top end of the rear wall, projects further than the top end of the front wall. Thus, the portion of the top end of the rear wall that projects further than the top end of the front wall can be sealed to the outer surface of the bottom end of the front wall. The top end and/or the bottom end of the bag can also comprise stitching there through.

In certain embodiments the bag further comprises a first side wall having an interior surface, an exterior surface, a top end and a bottom end, and a second side wall having an interior surface, an exterior surface, a top end and a bottom end. The first side wall and/or the second side wall can comprise gussets. In certain aspects at least a portion of the bottom end of the rear wall projects further than the bottom end of the first side wall, the bottom end of the second side wall, and the bottom end of the front wall. In an exemplary way to seal the bottom end of such bags, the portion of the bottom end of the rear wall that projects further than the bottom end of the first side wall, the bottom end of the second side wall, and the bottom end of the front wall can be sealed to the outer surface of the bottom end of the front wall. In additional aspects at least a portion of the top end of the front wall projects further than the top end of the first side wall, the top end of the second side wall and the top end of the rear wall. In these aspects the portion of the top end of the bag that projects further than the top end of the first side wall, the top end of the second side wall and the top end of the rear wall can be sealed to the outer surface of the top end of the rear wall.

Alternatively, a portion of the bottom end of the rear wall can project further than the bottom end of the first side wall and the bottom end of the second side wall, and a portion of the bottom end of the first side wall and the bottom end of the second side wall can project further than the bottom end of the front wall. In an exemplary way to seal the bottom end of such bags, the portion of the bottom end of the rear wall that projects further than the bottom end of the first side wall and the bottom end of the second side wall, and the portion of the bottom end of the first side wall and the bottom end of the second side wall that projects further than the bottom end of the front wall can be sealed to the outer surface of the bottom end of the front wall. In further aspects at least a portion of the top end of the front wall projects further that the top end of the first side wall and the top end of the second side wall, and the top end of the first side wall and the top end of the second side wall project further than the top end of the rear wall. In these aspects the portion of the front wall that projects further than the top end of the first side wall and the top end of the second side wall, and the portion of the top end of the first side wall and the top end of the second side wall that projects further than the top end of the rear wall can be sealed to the outer surface of the top end of the rear wall. In particular embodiments the top end and the bottom end of the bag are sealed, as set forth above, and the bag comprises at least ten pounds by weight of a bulk item. In certain aspects such sealed bags can comprise six printable surfaces.

Additionally, the bag can further comprise a third layer comprising a polymer positioned between the first layer and the second layer. The third layer can comprise a woven polymer, including, but not limited to, polypropylene, high density polyethylene, low density polyethylene, polyester, or any combination thereof. The third layer can alternatively comprise a polymeric film, including, but not limited to, polypropylene, polyethylene, polyethylene terephthalate, polyamide, or any combination thereof. The third layer can further comprise an oriented polymeric film, including, but not limited to, oriented polypropylene, biaxially-oriented polypropylene, oriented polyethylene, biaxially-oriented polyethylene, oriented polyethylene terephthalate, biaxially-oriented polyethylene terephthalate, oriented polyamide, biaxially-oriented polyamide, or any combination thereof.

The present disclosure additionally provides a bag comprising a front wall, a back wall, a first side wall, a second side wall, an interior surface, an exterior surface, a top end, a bottom end, a first layer and a second layer, the front wall, back wall, first side wall and second side wall having an interior surface, an exterior surface, a top end and a bottom end, wherein the first layer comprises a polymer and the second layer comprises a polymer attached to the first layer, and wherein the bag comprises an easy open feature located on the front wall of the bag, the back wall of the bag, the first side wall of the bag, the second side wall of the bag, or any combination thereof. The easy open feature can be located on the front wall, the back wall, the first side wall, the second side wall, or any combination thereof.

The present disclosure also provides a bag comprising a front wall, a back wall, an interior surface, an exterior surface, a top end, a bottom end and a first layer, each of the front wall and back wall having an interior surface, an exterior surface, a top end and a bottom end, wherein the first layer comprises a woven polymer, and wherein the bag comprises an easy open feature located on the front wall of the bag, the back wall of the bag, or a combination thereof. The first layer can comprise polypropylene, high density polyethylene, low density polyethylene, polyester, or any combination thereof. The bag can further comprise a second layer, which can comprise a polymeric film.

The present disclosure further provides a method of making an easy open feature in a woven polymer bag, comprising creating a weakened area in the woven polymer bag. The step of creating a weakened area can further comprise making a cut, a plurality of perforations, or scoring a line in a portion of the bag surface.

It is an object of the invention to provide a woven plastic bag that is stronger than bags made of plastic films, and yet easier to open than conventional woven bags.

It is another object of the invention to provide a woven plastic bag that includes an easy open feature and still provides strength and durability, reducing the potential for tearing, damage, infestation, and loss of contents.

It is still another object of the invention to provide a woven bag that can be manufactured more quickly and therefore is less costly than conventional bags, and that has an easy open feature that makes opening the woven bag easier than opening conventional woven bags.

It is still another object of the invention to provide a woven polymeric bag that provides an attractive high end graphic display on at least one end of the bags when are displayed or presented at the point of sale.

These and other objects of the invention will be apparent to those skilled in the art from the following detailed description.

DETAILED DESCRIPTION OF THE PREFERRED EMBODIMENT

Figure 1:
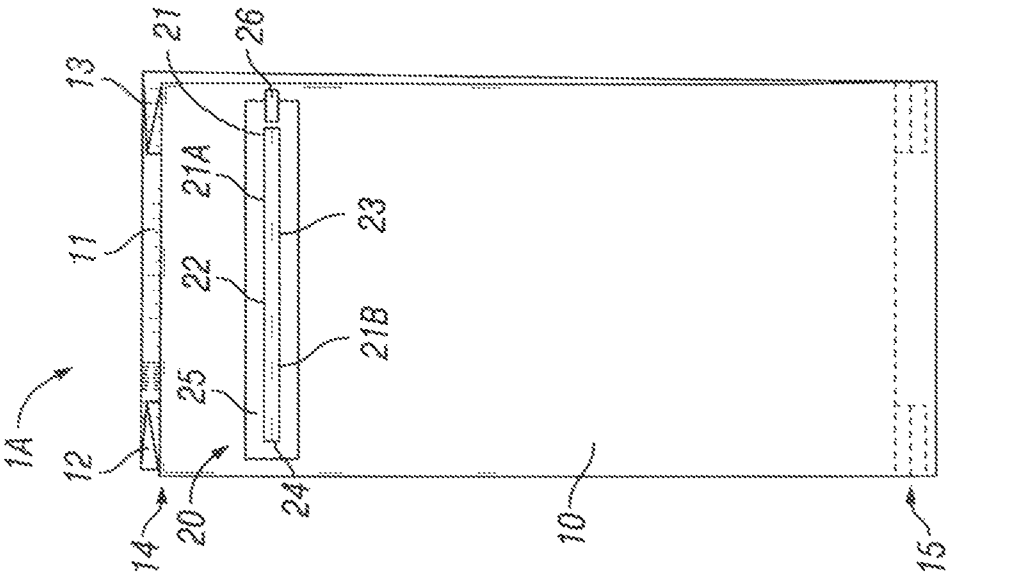
FIG. 1 shows a flush cut bag with an easy open feature comprising a square cut through the bag located near the top end of the bag according to one embodiment of the present disclosure.

Referring first to FIG. 1, the front side view of an embodiment of a "flush cut" bag 1*a* is shown. Bag 1*a* has a front wall 10, a back wall 11, a first side wall 12, a second side wall 13, a top end 14, and a bottom end 15. It will be apparent, however, that the orientation of the bag ends 14 and 15 is unimportant and the "top" and "bottom" references are useful but may change depending on the orientation one views the bag. Bag 1*a* is considered a "flush cut" bag because the front wall 10 and the back wall 11 are cut so that the ends of the front wall 10 and the back wall 11 are essentially "flush" with one another; they have substantially the same length. Bag 1*a* also comprises an easy open feature 20 near the top end 14 of the bag 1*a*, which in this embodiment comprises a full cut 21 in a rectangular shape having a first end 21*a* and a second end 21*b* through the front wall 10 of bag 1*a*, a first row of perforations 22 extending from the first end 21*a* of the cut 21, a second row of perforations 23 extending from the second end 21*b* of the cut 21, an optional third row of perforations 24 connecting the end of the first row of perforations 22 and the second row of perforations 23, tape 25 covering the cut and the rows of perforations, and a pull tab 26 attached to the tape 25. Although in this embodiment the easy open feature 20 is located near the top end 14 of the bag 1*a* and the pull tab is located close to the second side wall 13, the skilled artisan will realize that the easy open feature 20 could also be in the opposite orientation, with the pull tab located closer to the first side wall 12, reside in either orientation near the bottom end 15 of the front wall 10 of bag 1*a*, or reside in either orientation near the top end 14 or bottom end 15 on the back wall 11 of the bag 1*a*. The full cut 21 can be formed by punching, cutting, or through the use of a laser, or by any other technique known to those skilled in the art. The easy open feature 20 (in this embodiment the cut 21 and/or first 22 or second 23 row of perforations) provides a portion of bag 1*a* that is weakened. This weakened portion can be opened with less force than required to open or tear other portions of the bag 1*a*.

Bag 1*a* can be opened by pulling the pull tab 26, which removes the tape 25 and the portion of bag 1*a* defined by the cut 21 and the first, second, and third row of perforations 22, 23, and 24, respectively. Although not shown in this embodiment, it will be understood that the full cut 21 can be larger or smaller, and can extend to a greater or lesser extent, and the first and second rows of perforations 22 and 23, respectfully, can extend any distance from the first end and second end, respectively, of the cut toward the opposite side wall of the bag, for example 50%, 75%, 90% or about 100% of the distance from the ends of the cut to the opposite side of the bag. In addition, although not shown in this embodiment, the tape 25 can cover less than the full extent of the first and second rows of perforations, whatever distance the rows of perforations extend across the front wall of the bag, and in certain embodiments covers only the full cut portion of the easy open feature 20. Additionally, the pull tab 26 can comprise black and white and/or color printing (not shown), for example a coupon (not shown), and can also be used to reclose the bag.

Figure 2:
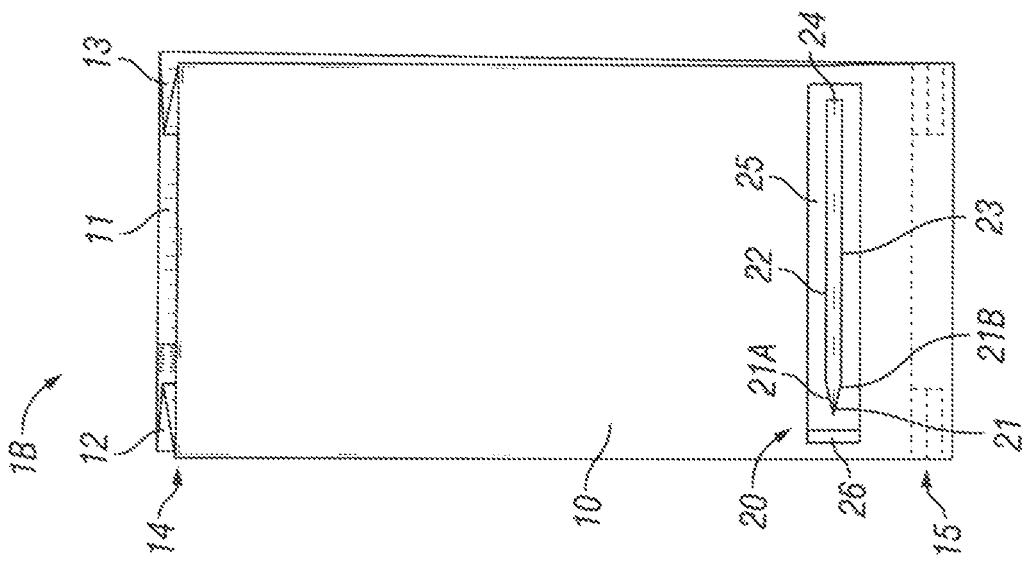
FIG. 2 shows a flush cut bag with an easy open feature comprising a carat cut through the bag located near the top end of the bag according to one embodiment of the present disclosure.

Referring to FIG. 2, the front side view of another embodiment of a flush cut bag 1*b* is shown. Bag 1*b* also has a front wall 10, a back wall 11, a first side wall 12, a second side wall 13, a top end 14, and a bottom end 15. Bag 1*b* also comprises an easy open feature 20, which in this embodiment is near the bottom end 15 of the bag 1*b* and comprises a full cut 21 in a triangular or carat shape having a first end 21*a* and a second end 21*b* through the front wall 10 of bag 1*b*, a first row of perforations 22 extending from the first end 21*a* of the cut 21, a second row of perforations 23 extending from the second end 21*b* of the cut 21, an optional third row of perforations 24 connecting the end of the first row of perforations 22 and the second row of perforations 23, tape 25 covering the cut and the rows of perforations, and a pull tab 26 attached to the tape 25.

Figure 3:
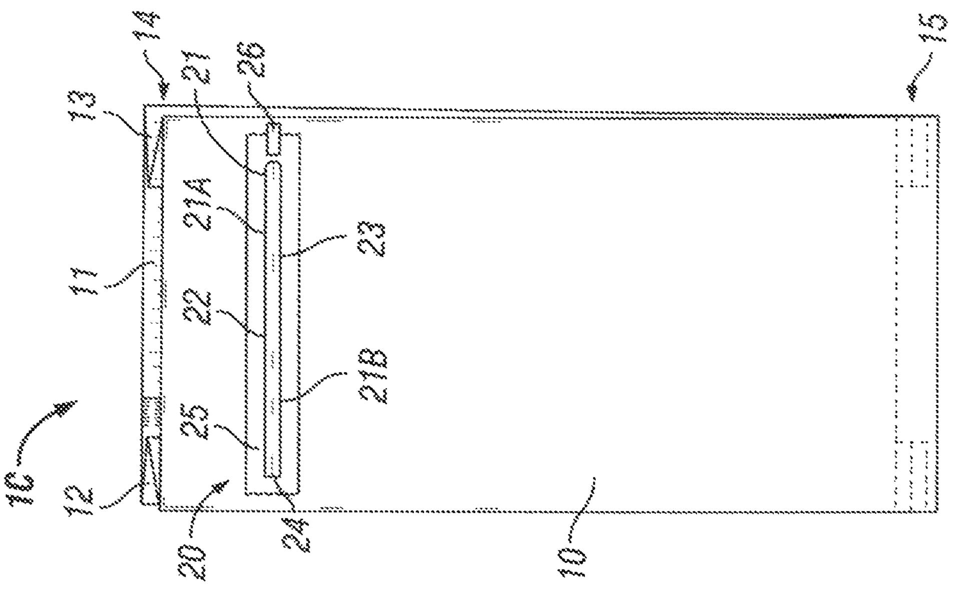
FIG. 3 shows a flush cut bag with an easy open feature comprising a semi-circular cut through the bag located near the top end of the bag according to one embodiment of the present disclosure.

Referring to FIG. 3, the front side view of yet another embodiment of a flush cut bag 1*c* is shown. Bag 1*c* also has a front wall 10, a back wall 11, a first side wall 12, a second side wall 13, a top end 14, and a bottom end 15. Bag 1*c* also comprises an easy open feature 20, which in this embodiment is near the top end 14 of the bag 1*c* and comprises a full cut 21 in a semi-circular shape having a first end 21*a* and a second end 21*b* through the front wall 10 of bag 1*c*, a first row of perforations 22 extending from the first end 21*a* of the cut 21, a second row of perforations 23 extending from the second end 21*b* of the cut 21, an optional third row of perforations 24 connecting the end of the first row of perforations 22 and the second row of perforations 23, tape 25 covering the cut and the rows of perforations, and a pull tab 26 attached to the tape 25.

Figure 4:
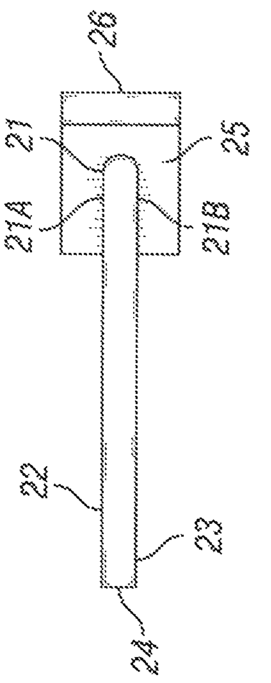
FIG. 4 shows a pull tab comprising a promotional coupon according to one embodiment of the present disclosure.

Referring to FIG. 4, an alternate embodiment of tape 25 and pull tab 26 is shown, where tape 25 covers the full cut 21 in a semi-circular shape having a first end 21*a* and a second end 21*b*, but does not cover the full extent of the first row of perforations 22 and the second row of perforations 23, and does not cover the third row of perforations 24. In this embodiment, the pull tab 26 includes instructions to open the bag, but can also comprise black and white and/or color printing (not shown), for example a promotional coupon (not shown).

Figure 5:
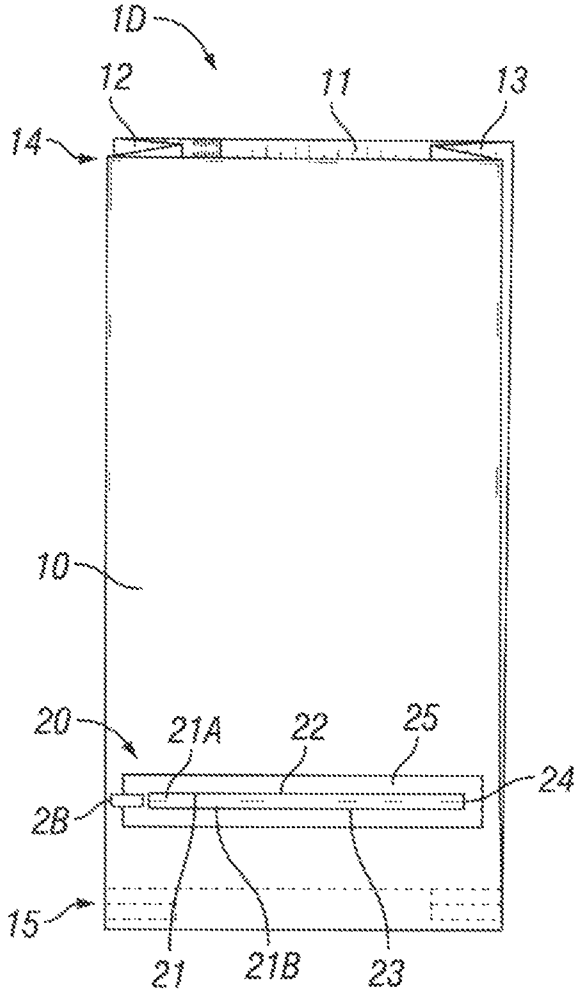
FIG. 5 shows a flush cut bag with an easy open feature comprising a square cut through the bag located near the bottom end of the bag according to one embodiment of the present disclosure.

Referring to FIG. 5, the front side view of still another embodiment of a flush cut bag 1*d* is shown. Bag 1*d* also has a front wall 10, a back wall 11, a first side wall 12, a second side wall 13, a top end 14, and a bottom end 15. Bag 1*d* also comprises an easy open feature 20, which in this embodiment is near the bottom end 15 of the bag 1*d* and comprises a full cut 21 in a rectangular shape having a first end 21*a* and a second end 21*b* through the front wall 10 of bag 1*d*, a first row of perforations 22 extending from the first end 21*a* of the cut 21, a second row of perforations 23 extending from the second end 21*b* of the cut 21, an optional third row of perforations 24 connecting the end of the first row of perforations 22 and the second row of perforations 23, tape 25 covering the cut and the rows of perforations, and a pull tab 26 attached to the tape 25.

Figure 6:
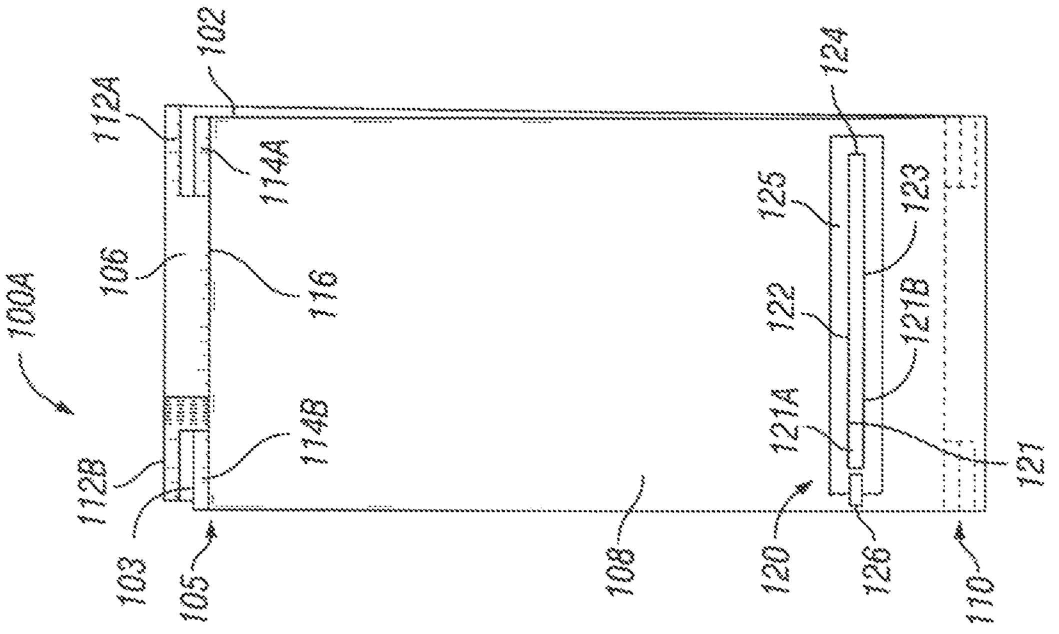
FIG. 6 shows a pinch cut bag with an easy open feature comprising a square cut through the bag located near the bottom end of the bag according to one embodiment of the present disclosure.

Referring to FIG. 6, the front side view of one embodiment of a "pinch cut" bag 100*a* is shown. As shown in FIG. 6, the bag 100*a* has a first or top end 105 and a second or bottom end 110. Once again, it will be apparent, however, that the orientation of the bag ends 105 and 110 is unimportant and the "top" and "bottom" references are useful but may change depending on the orientation one views the bag. Bag 100*a* is considered a "pinch cut" bag because one of the front wall 108 or the back wall 106 are cut so that one of the ends of the front wall 108 or the back wall 106 is longer than the other; they have different lengths. In the embodiment shown in FIG. 6 both of the ends of the bag 100*a* have a "pinch cut." The bag 100*a* has a front wall or surface 108 with top end 116, a rear wall or surface 106, and two side walls 102 and 103. Those skilled in the art will appreciate that conventional techniques can be used to provide side gussets in the bag 100*a* for each of sides 102 and 103 during this forming process. The first end 105 of bag 100*a* has portions 112*a* and 112*b* of the rear wall or surface 108 of the bag that extend further from the body of the bag 100*a* than do portions 114*a* and 114*b* of the material of bag 100*a* forming the side gussets for sides 102 and 103. In addition, the portions 114*a* and 114*b* of the side gussets extend further from the body of the bag 100*a* than the top end 116 of the front wall 108 of the bag 100*a*. As shown in FIG. 6, the front wall 108 of the bag 100*a* has an end portion 116 at the first end 105 of the bag that does not extend as far from the body of the bag 100*a* as the end portions 114*a* and 114*b* of the side gussets or the end portions 112*a* and 112*b* of the rear wall of the first end 105 of the bag 100*a*. Bag 100*a* also comprises an easy open feature 120 near the top end 105 of the bag

100*a*, which in this embodiment comprises a full cut 121 in a rectangular shape having a first end 121*a* and a second end 121*b* through the front wall 108 of bag 100*a*, a first row of perforations 122 extending from the first end 121*a* of the cut 121, a second row of perforations 123 extending from the second end 121*b* of the cut 121, an optional third row of perforations 124 connecting the end of the first row of perforations 122 and the second row of perforations 123, tape 125 covering the cut and the rows of perforations, and a pull tab 126 attached to the tape 125.

Figure 7:
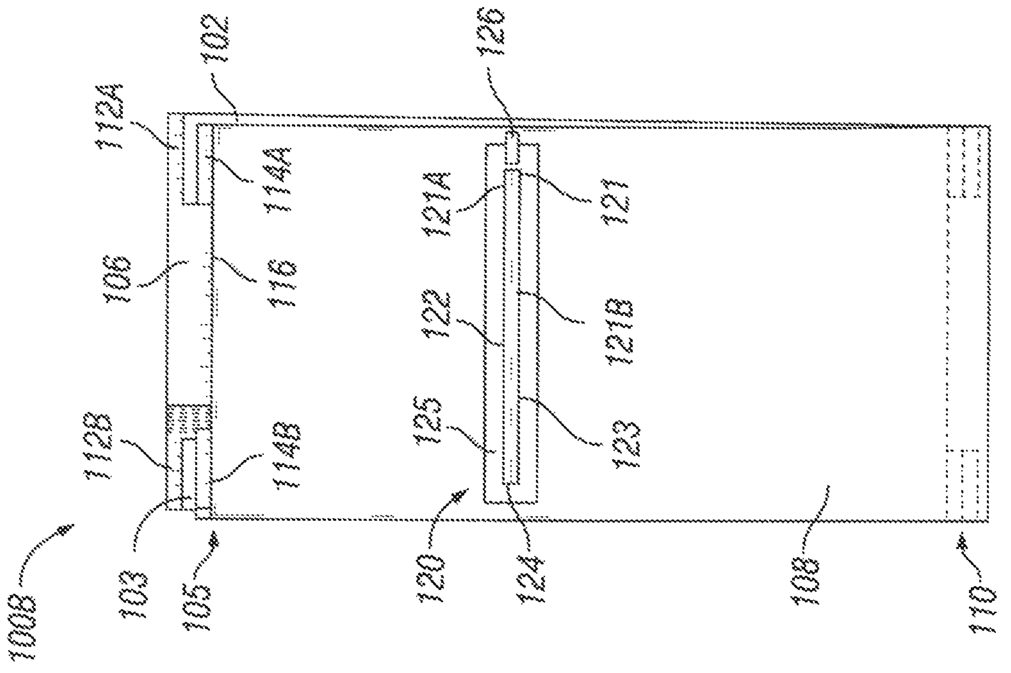
FIG. 7 shows a pinch cut bag with an easy open feature comprising a square cut through the bag located near the top end of the bag according to one embodiment of the present disclosure.

Referring to FIG. 7, the front side view of another embodiment of a pinch cut bag 100*b* is shown. As shown in FIG. 7, the bag 100*b* has a first or top end 105 and a second or bottom end 110. The bag 100*b* has a front wall or surface 108 with top end 116, a rear wall or surface 106, and two side walls 102 and 103. The first end 105 of bag 100*b* has portions 112*a* and 112*b* of the rear wall or surface 108 of the bag that extend further from the body of the bag 100*b* than do portions 114*a* and 114*b* of the material of bag 100 forming the side gussets for sides 102 and 103. In addition, the portions 114*a* and 114*b* of the side gussets extend further from the body of the bag 100*b* than the top end 116 of the front wall 108 of the bag 100*b*. As shown in FIG. 7, the front wall 108 of the bag 100*b* has an end portion 116 at the first end 105 of the bag that does not extend as far from the body of the bag 100*b* as the end portions 114*a* and 114*b* of the side gussets or the end portions 112*a* and 112*b* of the rear wall of the first end 105 of the bag 100*b*. Bag 100*b* also comprises an easy open feature 120, which in this embodiment is near the bottom end 110 of the bag 100*b* and comprises a full cut 121 in a rectangular shape having a first end 121*a* and a second end 121*b* through the front wall 108 of bag 100*b*, a first row of perforations 122 extending from the first end 121*a* of the cut 121, a second row of perforations 123 extending from the second end 121*b* of the cut 121, an optional third row of perforations 124 connecting the end of the first row of perforations 122 and the second row of perforations 123, tape 125 covering the cut and the rows of perforations, and a pull tab 126 attached to the tape 125.

Figure 8:
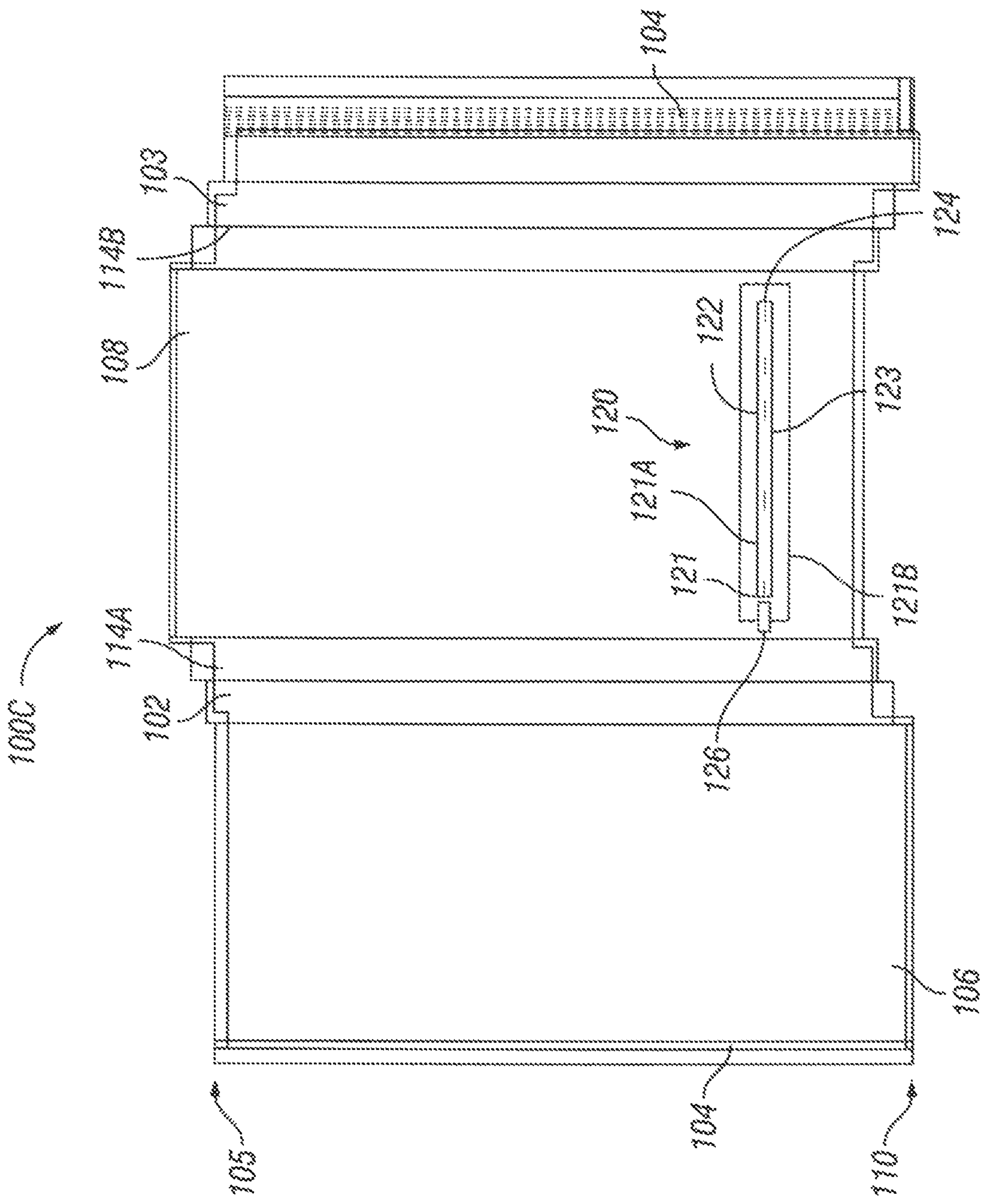
FIG. 8 shows an outline of a pinch cut bag with an easy open feature comprising a square cut through the bag located near the bottom end of the front panel of the bag according to one embodiment of the present disclosure.

Referring to FIG. 8, a planar view of an embodiment of a substantially flat sheet of material from which a bag 100*c* is to be formed is shown. Shown on the sheet are front wall 108, rear wall 106, first side 102 having gusset portion 114*a*, second side 103 having gusset portion 114*b*, seam 104, top end 105 and bottom end 110. Also shown is easy open feature 120, which in this embodiment is near the bottom end 110 of the front wall 108 of the bag 100*c* and comprises a full cut 121 in a rectangular shape having a first end 121*a* and a second end 121*b* through the front wall 108 of bag 100*c*, a first row of perforations 122 extending from the first end 121*a* of the cut 121 across the front wall 108 of bag 100*a*, a second row of perforations 123 extending from the second end 121*b* of the cut 121 across the front wall 108 of bag 100*c*, an optional third row of perforations 124 connecting the end of the first row of perforations 122 and the second row of perforations 123, tape 125 covering the cut 121 and the rows of perforations, and a pull tab 126 attached to the tape 125.

Figure 9:
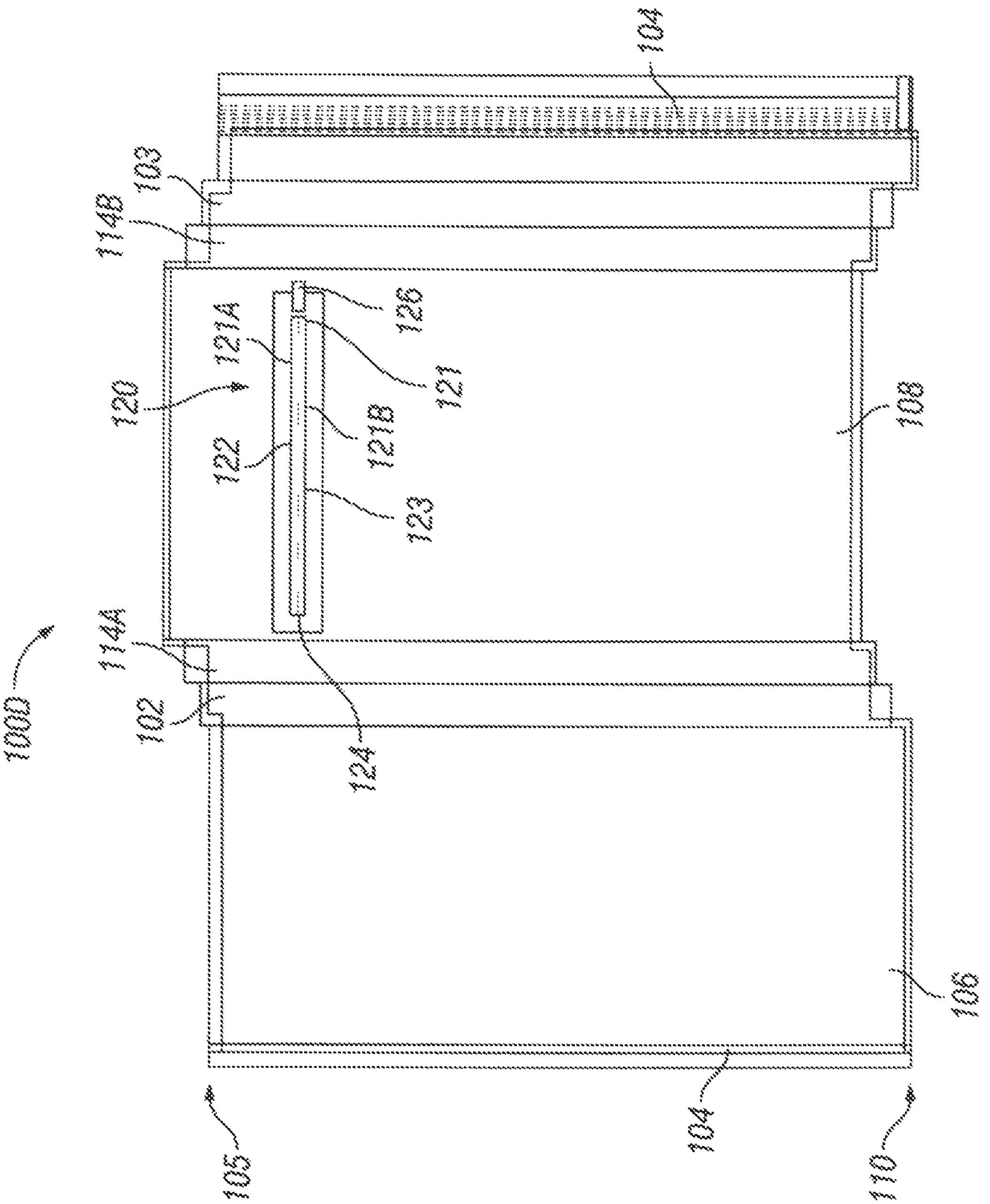
FIG. 9 shows an outline of a pinch cut bag with an easy open feature comprising a square cut through the bag located near the top end of the front panel of the bag according to one embodiment of the present disclosure.

Referring to FIG. 9, a planar view of another embodiment of a substantially flat sheet of material from which a bag 100*d* is to be formed is shown. Shown on the sheet are front wall 108, rear wall 106, first side 102 having gusset portion 114*a*, second side 103 having gusset portion 114*b*, seam 104, top end 105 and bottom end 110. Also shown is easy open feature 120, which in this embodiment is near the top end 105 of the front wall 108 of the bag 100*d* and comprises a full cut 121 in a rectangular shape having a first end 121*a* and a second end 121*b* through the front wall 108 of bag 100*d*, a first row of perforations 122 extending from the first end 121*a* of the cut 121 across the front wall 108 of bag 100*d*, a second row of perforations 123 extending from the second end 121*b* of the cut 121 across the front wall 108 of bag 100*d*, an optional third row of perforations 124 connecting the end of the first row of perforations 122 and the second row of perforations 123, tape 125 covering the cut 121 and the rows of perforations, and a pull tab 126 attached to the tape 125.

Figure 10:
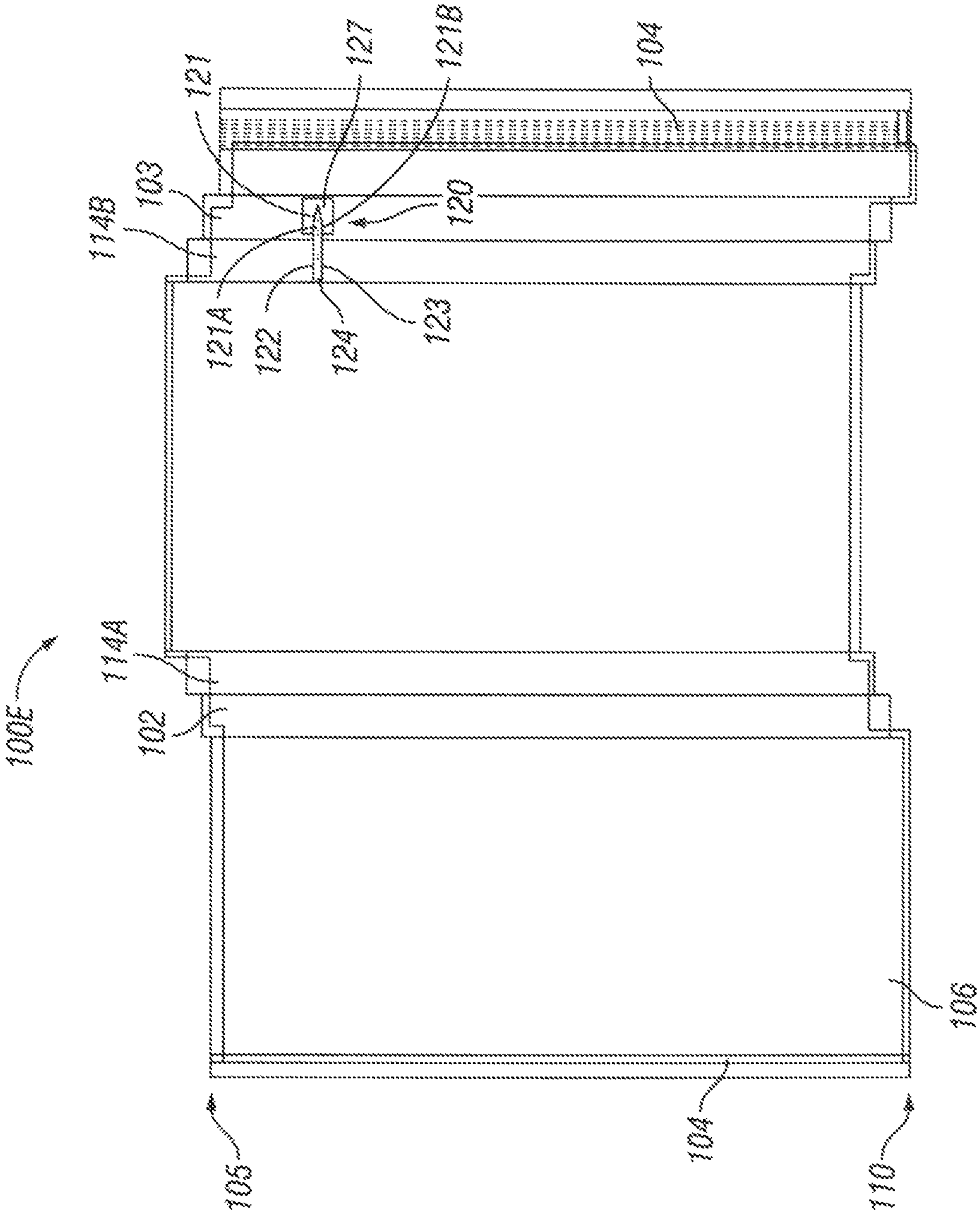
FIG. 10 shows an outline of a pinch cut bag with an easy open feature comprising a carat cut through the bag located near the top end of a side panel of the bag and extending through the side panel according to one embodiment of the present disclosure.

Referring to FIG. 10, a planar view of another embodiment of a substantially flat sheet of material from which a bag 100*e* is to be formed is shown. Shown on the sheet are front wall 108, rear wall 106, first side 102 having gusset portion 114*a*, second side 103 having gusset portion 114*b*, seam 104, top end 105 and bottom end 110. Also shown is easy open feature 120, which in this embodiment is near the top end 105 of the second side 103 of the bag 100*e* and comprises a full cut 121 in a carat shape having a first end 121*a* and a second end 121*b* through the second side 103 of bag 100*e*, a first row of perforations 122 extending from the first end 121*a* of the cut 121 across the second side 103 of bag 100*e*, a second row of perforations 123 extending from the second end 121*b* of the cut 121 across the second side 103 of bag 100*e*, an optional third row of perforations 124 connecting the end of the first row of perforations 122 and the second row of perforations 123, and a pull tape 127 covering the cut 121 and a small portion of the first row of perforations 122 and second row of perforations 123.

Figure 11:
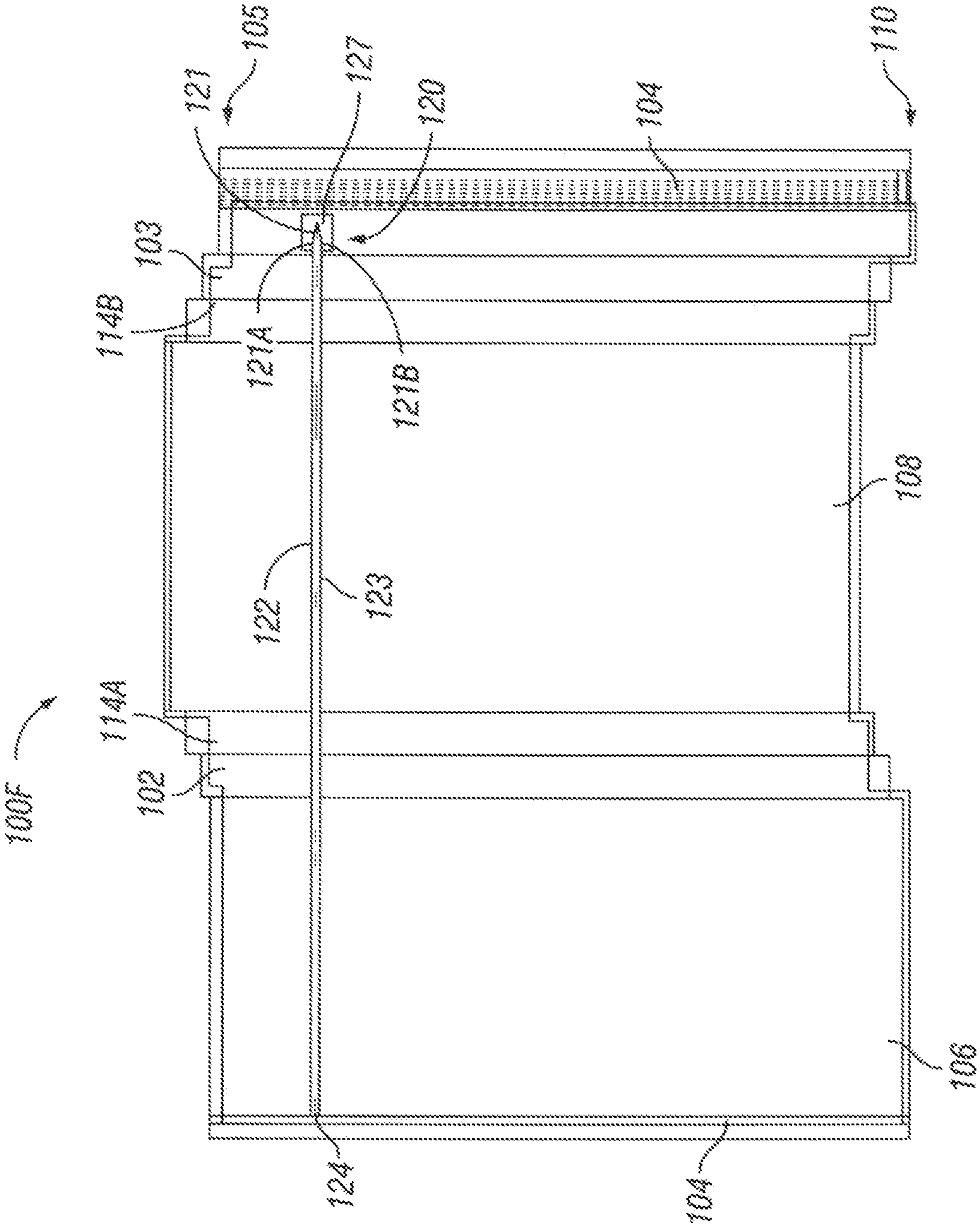
FIG. 11 shows an outline of a pinch cut bag with an easy open feature comprising a carat cut through the bag located near the top end of a side panel of the bag and extending across the entire length of the bag according to one embodiment of the present disclosure.

Referring to FIG. 11, a planar view of another embodiment of a substantially flat sheet of material from which a bag 100*f* is to be formed is shown. Shown on the sheet are front wall 108, rear wall 106, first side 102 having gusset portion 114*a*, second side 103 having gusset portion 114*b*, seam 104, top end 105 and bottom end 110. Also shown is easy open feature 120, which in this embodiment is near the top end 105 of the second side 103 of the bag 100*f* and comprises a full cut 121 in a carat shape having a first end 121*a* and a second end 121*b* through the second side 103 of bag 100*f*, a first row of perforations 122 extending from the first end 121*a* of the cut 121 across the second side 103, front wall 108, first side 102 and rear wall 104 of bag 100*f*, a second row of perforations 123 extending from the second end 121*b* of the cut 121 across the second side 103, front wall 108, first side 102 and rear wall 104 of bag 100*f*, an optional third row of perforations 124 connecting the end of the first row of perforations 122 and the second row of perforations 123, and a pull tape 127 covering the cut 121 and a small portion of the first row of perforations 122 and second row of perforations 123.

Figure 12:
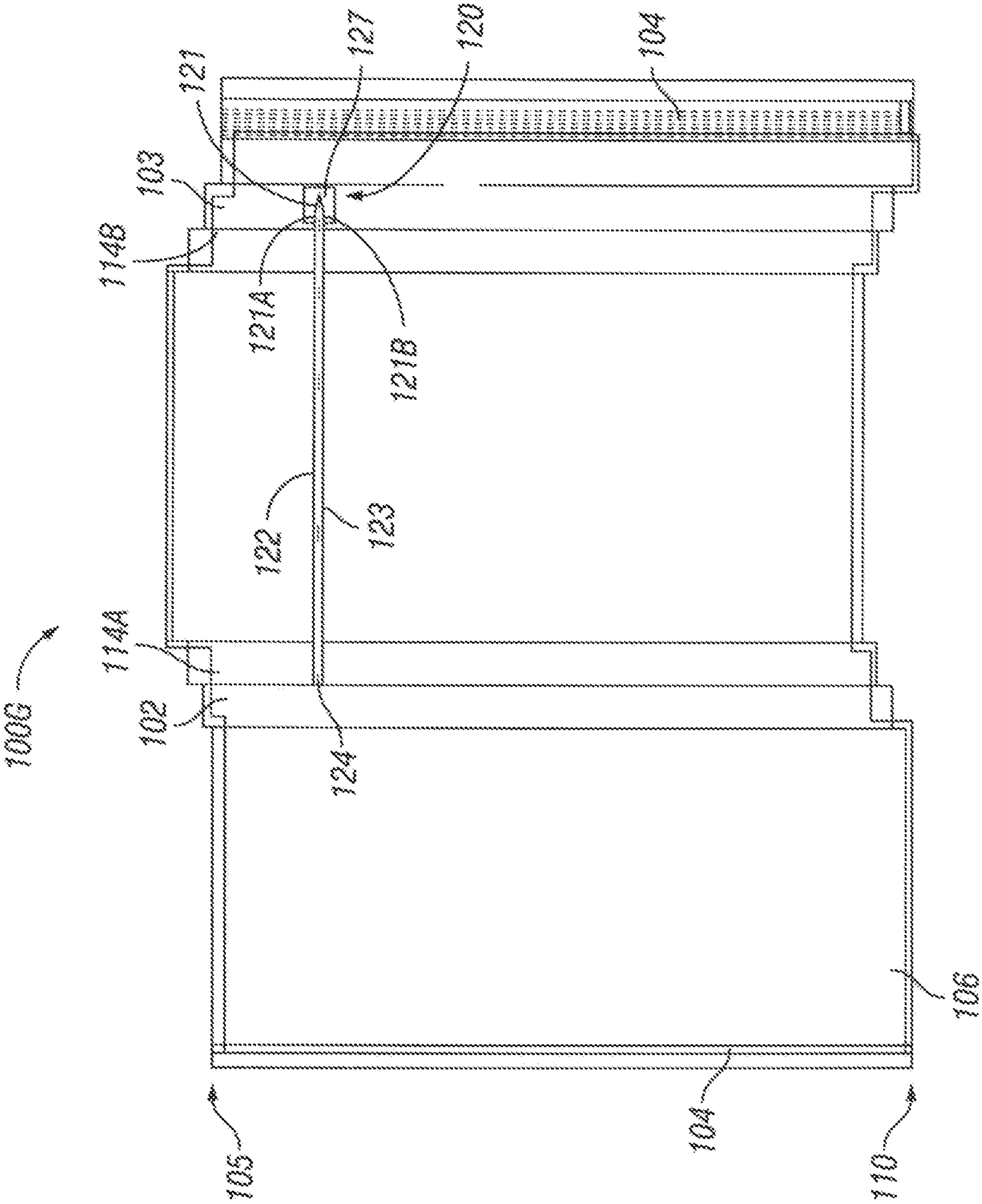
FIG. 12 shows an outline of a pinch cut bag with an easy open feature comprising a carat cut through the bag located near the top end of a side panel of the bag and extending across the side panel and the front panel of the bag according to one embodiment of the present disclosure.

Referring to FIG. 12, a planar view of another embodiment of a substantially flat sheet of material from which a bag 100*g* is to be formed is shown. Shown on the sheet are front wall 108, rear wall 106, first side 102 having gusset portion 114*a*, second side 103 having gusset portion 114*b*, seam 104, top end 105 and bottom end 110. Also shown is easy open feature 120, which in this embodiment is near the top end 105 of the second side 103 of the bag 100*g* and comprises a full cut 121 in a carat shape having a first end 121*a* and a second end 121*b* through the second side 103 of bag 100*g*, a first row of perforations 122 extending from the first end 121*a* of the cut 121 across the second side 103, front wall 108 and into the first side 102 of bag 100*g*, a second row of perforations 123 extending from the second end 121*b* of the cut 121 across the second side 103, front wall 108 and into the first side 102 of bag 100*g*, an optional third row of perforations 124 connecting the end of the first row of perforations 122 and the second row of perforations 123, and a pull tape 127 covering the cut 121 and a small portion of the first row of perforations 122 and second row of perforations 123.

Figure 13:
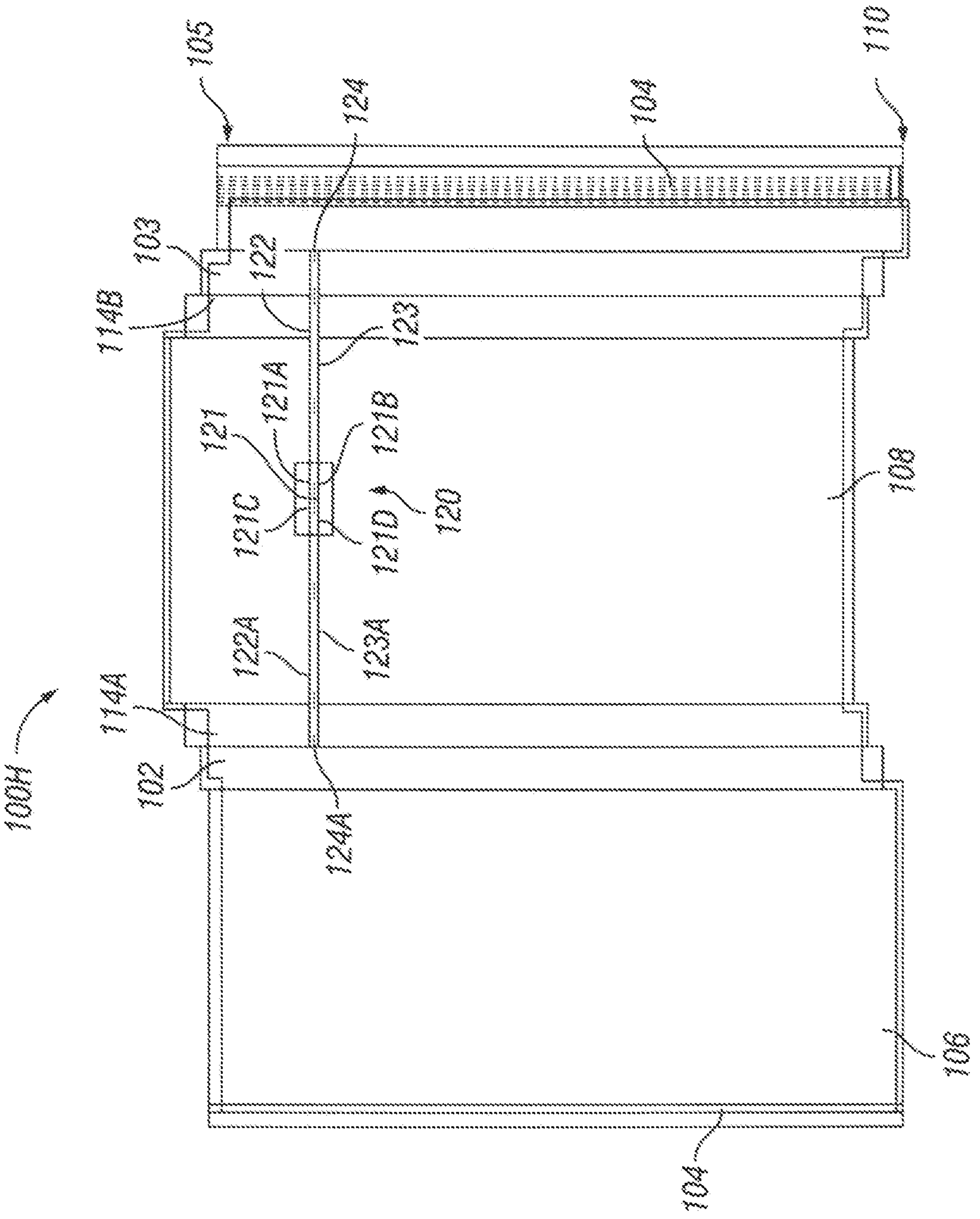
FIG. 13 shows an outline of a pinch cut bag with an easy open feature comprising a bidirectional square cut through the bag located near the top end of the front panel of the bag and extending into both side panels according to one embodiment of the present disclosure.

Referring to FIG. 13, a planar view of another embodiment of a substantially flat sheet of material from which a bag 100*h* is to be formed is shown. Shown on the sheet are front wall 108, rear wall 106, first side 102 having gusset portion 114*a*, second side 103 having gusset portion 114*b*, seam 104, top end 105 and bottom end 110. Also shown is easy open feature 120, which in this embodiment is near the top end 105 of the front wall 108 of the bag 100*h* and comprises a bidirectional full cut 121 in a square shape having a first end 121*a*, a second end 121*b*, a third end 121*c* and a fourth end 121*d* through the front wall 108 of bag 100*h*, a first row of perforations 122 extending from the first end 121*a* of the cut 121 across the front wall 108 and into the first side 102 of bag 100*h*, a second row of perforations 123 extending from the second end 121*b* of the cut 121 across the front wall 108 and into the first side 102 of bag 100*h*, an optional third row of perforations 124 connecting the end of the first row of perforations 122 and the second row of perforations 123, a fourth row of perforations 122*a* extending from the third end 121*c* of the cut 121 across the front wall 108 and into the second side 103 of bag 100*h*, a fifth row of perforations 123*a* extending from the fourth end 121*d* of the cut 121 across the front wall 108 and into the second side 103 of bag 100*h*, an optional sixth row of perforations 124*a* connecting the end of the fourth row of perforations 122*a* and the fifth row of perforations 123*a*, and a pull tape 127 covering the cut 121 and a small portion of the first row of perforations 122, second row of perforations 123, fourth row of perforations 122*a* and fifth row of perforations 123*a*.

Figure 14:
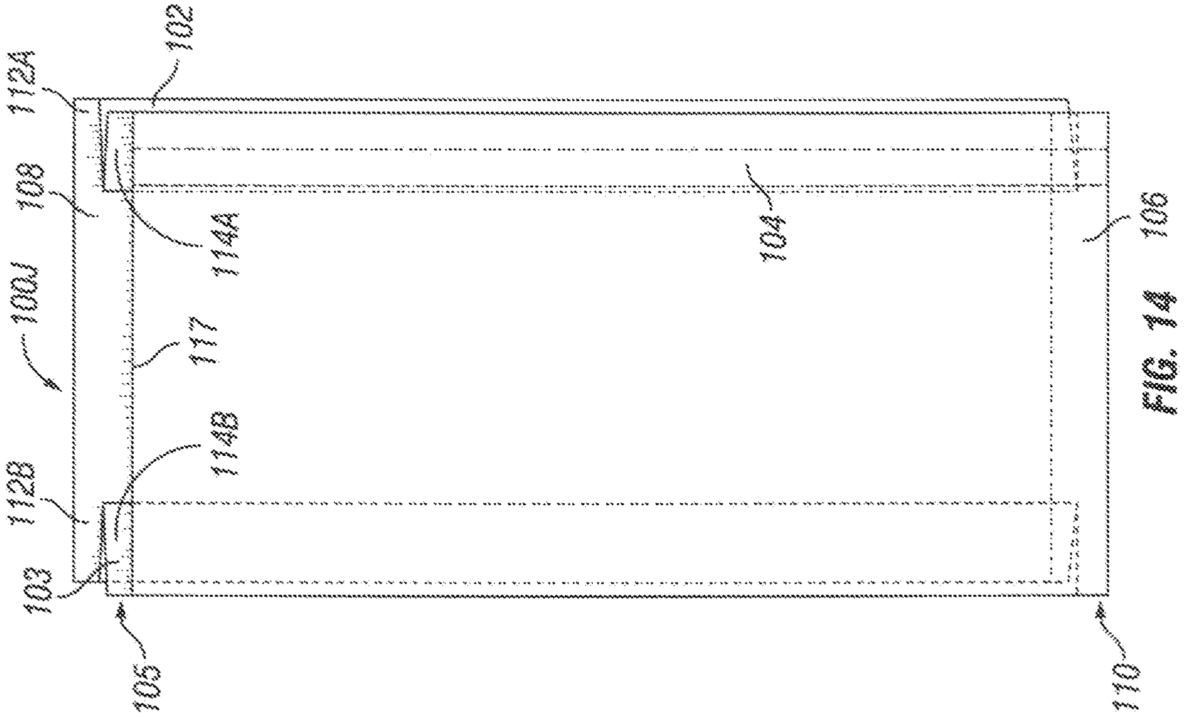
FIG. 14 shows a back side view of a pinch cut bag according to one embodiment of the present disclosure.

Referring to FIG. 14, the back side view of yet another embodiment of a pinch cut bag 100*j* is shown. As shown in FIG. 14, the bag 100*j* has a first end 105 and a second end 110. It is useful to think of first and second ends 105 and 110 as the top and bottom ends of the bag 100*j*, respectively. The bag 100*j* has a front wall or surface 108, a rear wall or surface 106, and two side walls 102 and 103. The bag 100*j* also has a seam 104 on the back side, or rear wall or surface. The seam 104 is made when the bag 100 is formed using conventional methods known to those skilled in the art. Using such conventional methods, a material from which a bag 100*j* is to be formed (such materials are discussed in detail below) is provided in a substantially flat sheet (see FIG. 8 through FIG. 13). The sheet is then directed and formed so that a portion of one side of the sheet is disposed on top of the other side of the sheet, such as in forming a tube. The overlapping portion is then secured and sealed together, forming the seam 104. Those skilled in the art will appreciate that conventional techniques can be used to provide side gussets in the bag 100*j* for each of sides 102 and 103 during this forming process.

The bottom (as shown in FIG. 14) of the first end 105 of bag 100*j* has portions 112*a* and 112*b* of the front wall 108 or surface of the bag that extend further from the body of the bag 100*j* than do portions 114*a* and 114*b* of the material of bag 100*j* forming the side gussets for sides 102 and 103. In addition, the portions 114*a* and 114*b* of the side gussets extend further from the body of the bag 100*j* than the top end 117 of the rear wall 106 of the bag 100*j*. As shown in FIG. 14, the rear wall of the bag 100*j* has a top end 117 that does not extend as far from the body of the bag 100*j* as the end portions 114*a* and 114*b* of the side gussets or the end portions 112*a* and 112*b* of the front wall 108 of the bag 100*j*.

Figure 15:
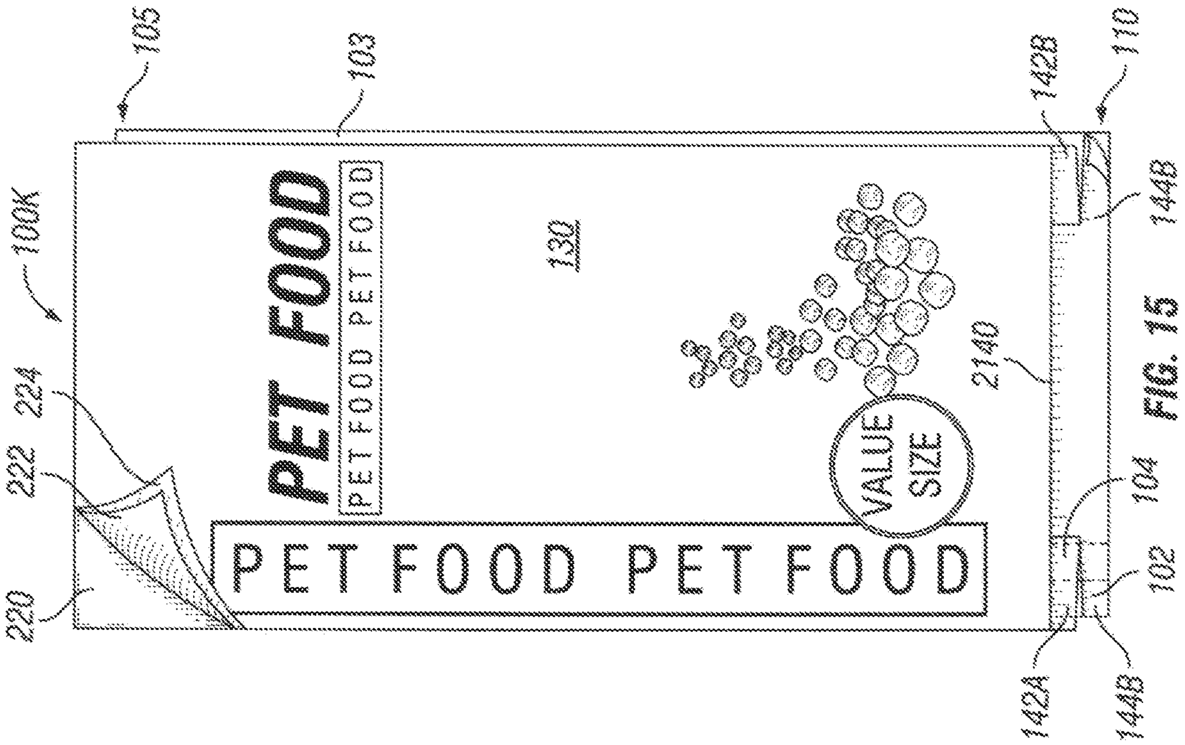
FIG. 15 shows a front side view of a printed pinch cut bag with an easy open feature comprising a square cut through the bag located near the top end of the bag according to one embodiment of the present disclosure.

Now referring to FIG. 15, a top side view of bag 100*k* is provided. For ease of reference, the same numerals are used in the Figures to denote the same features of bag 100*k*. As shown in FIG. 15, the bag 100*k* comprises multiple layers of materials 220, 222 and 224. The first layer 220 is preferably a woven polymeric material, such as polypropylene, polyester, high-density polyethylene, or polyethylene. The woven plastic layer 220 can be made of woven strips of plastic made of film to provide great strength from relatively lightweight materials, and can also be stretched to provide greater strength. For example, cross-laminated, woven plastic film strips, like XF films, are useful and are commercially available from Valeron. Similarly, a biaxially oriented polypropylene plastic material is commercially available from the AmTopp Division of Inteplast Group, Ltd. Those skilled in the art will appreciate that other materials, including various blends of polypropylene and polyethylene can be used without departing from the scope of the invention.

Still referring to FIG. 15, the layer 222 is a coating or a lamination, preferably a polypropylene film. Layer 224 is preferably an oriented polypropylene film with reverse printing. The layer 224 can comprise reverse printing of various labels, advertising, warnings, and other information as may be desired, such as the cover 130 shown in FIG. 15. Although not shown, those skilled in the art will appreciate that the top side, back side, and sides 102 and 103 of the bag 100 may all contain such pictures, patterns, or information as may be desired. Those skilled in the art will appreciate that the reverse printing of layer 224 can be achieved with conventional techniques, and with various conventional plastic films. An advantage of printing the bottom portion of the front and/or back panels is the provision of information that remains visible when the bag is on a display shelf in a store.

Still referring to FIG. 15, the bottom side (as shown in FIG. 15) of the bag 100*k* extends outward from the body of the bag 100*k* at the second end 110 of the bag 100*k*. As shown in FIG. 15, the top side of the bag 100*k* has an end portion 140 extending along the width of the bag 100*k*. The side gussets of the sides 102 and 103 of the bag 100*k* each have portions 142*a* and 142*b* which extend further towards the second end 110 of the bag 100*k* than the end portion 140 of the top side of bag 100*k*. In addition, the bottom side of the bag 100*k* has an end portion 110 that extends further from the end portions 142*a* and 142*b* of the side gussets. The end portion 110 of the bag 100*k* includes portions 144*a* and 144*b*. As shown in FIG. 15, the second end portion of the bottom side of the bag 100*k* extends along the entire width of the bag 100*k*. Also shown is seam 104.

Still referring to FIG. 15, the exposed end portions 144*a* and 144*b* of the bottom side of the bag 100*k* can be coated with a durable adhesive. The adhesive can be applied to selective surface areas, such as portions 144*a* and 144*b*, or can be applied in a line extending across the bottom side of the bag 100*k* along the second end portion 110, including portions 144*a* and 144*b*. After the adhesive is applied, preferably the sides 102 and 103 of the bag 100, together with the bottom side of the bag 100*k* are folded so that at least a portion of the interior surface of the bottom side of the bag 100*k* extends over the top surface of the top side of the bag 100*k*. Preferably, the portions 142*a* and 142*b* of the side gussets will be folded over and attached to the top surface of the top side of the bag 100*k*, as well as portions 144*a* and 144*b* of the second end 110 of the bottom side of the bag 100*k*. The coating then seals the second end 110 of the bag 100*k* together. The first end 105 of the bag 100*k* can be sealed in a similar fashion if desired. Alternatively, the first end 105 or second end 110 of the bag 100*k* can be sealed using a hot melt technique or any other technique well-known to those skilled in the art.

Figure 16:
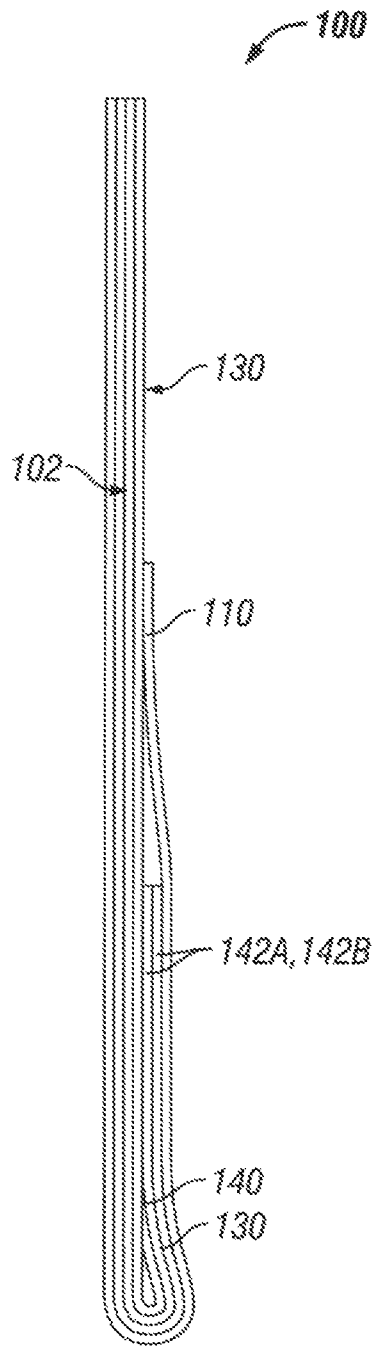
FIG. 16 shows a cross-sectional view of a top end or bottom end portion of a pinch cut bag according to one embodiment of the present disclosure.

Referring now to FIG. 16, a detailed cross-sectional view of an end portion of the bag 100 is provided. As shown in FIG. 16, at least a portion of the front side 130 of bag 100 is now covered by the lowest edge portion 110 of the back side of bag 100, the extending portions 142*a*, 142*b* of side 102 of the bag 100, as well as a portion of the front side 130 of bag 100 including end portion 140. Once these portions are folded over, heat and pressure can be applied as appropriate to obtain and ensure that the bottom end 110 of bag 100 is durably sealed, such as with a conventional heat sealable adhesive.

Once the bag 100 is sealed at one end, it can be filled with the desired materials. It has been found that a bag 100 with a height of 41 inches and a width of 28 inches can durably hold at least about fifty (50) pounds of material without showing undue stress, tearing, breakage or the like. It is believed that any bulk material can be contained by bag 100, and the contents can weigh up to 100 pounds or so without undue risk of tearing or damage to bag 100. Once the bag 100 is filled, the second end typically needs to be sealed. The second end of the bag 100 can be sealed in a similar manner as that described above for the bottom end 110. Alternatively, the bag 100 can have its second end sealed by conventional means such as sewing. Still another approach is to seal the second end in a manner like that described for the bottom end 110 of the bag 100, and then stitching one of the two ends (not shown). Although not shown, those skilled in the art will understand and appreciate that a second end of bag 100 can be sealed with conventional techniques once bag 100 has been filled with the selected amount of the desired material.

Figure 17:
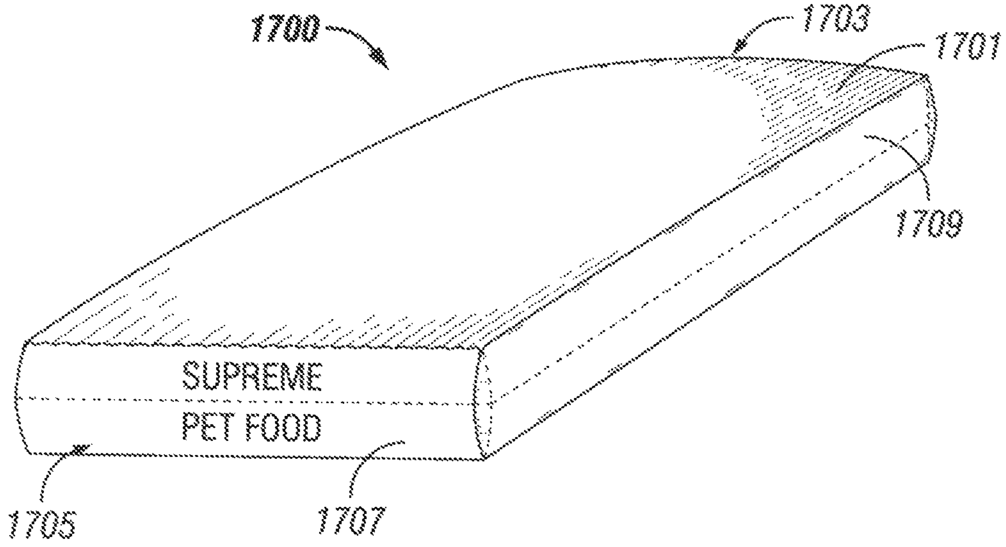
FIG. 17 shows an isometric view of a pinch cut bag according to one embodiment of the present disclosure.

Referring now to FIG. 17, an isometric view of bag 1700 is provided. As shown in FIG. 17, the bag 1700 includes a front panel 1701, a first side panel with gussets 1709, a second side panel with gussets (not visible in FIG. 17), a top end 1703, and a bottom end 1705. The bag 1700 is a pinch cut bag like those described previously, with both a pinch cut top end 1703 and a pinch cut bottom end 1705. The bag 1700 preferably has a weakened area (not shown in FIG. 17) or other easy open feature on at least one surface (not shown in FIG. 17). As shown in FIG. 17, the bag 1700 has been filled and sealed and contains one or more materials. Although the contents of the bag 1700 may be food, animal food, other bulk items, the contents may also contain liquids or mixtures. Those skilled in the art will appreciate that the bag 1700, once formed in accordance with the present disclosure, may be filled and then either the top end 1703 or the bottom end 1705 or both may be sealed as described previously. As shown in FIG. 17, the bag 1700, once filled, presents a bottom panel 1707 on the bottom end 1705 thereof and a top panel on the top end thereof (not visible in FIG. 17). The bag 1700 may be stacked on top of similar or different bags, such as at a grocery store, pet store, or other display location, such that panel 1707 is easily visible to a consumer. As shown in FIG. 17 the front panel 1701, the first side panel 1709 and the bottom panel 1707 includes printing (and can also include graphics), and it will be appreciated by the skilled artisan that the top panel, the rear panel, and the second side panel of bag 1700, which are not visible in FIG. 17, can also include graphics and/or printing. Thus bag 1700 has six discrete areas for printing and/or graphics, each formed by a discrete surface area of the bag 1700. Additionally, the printing and/or graphics can extend across more than one panel, or any combination of the six panels (not shown). The panel 1707 may include graphics and/or printing so that a consumer is able to quickly, readily and easily identify the brand of the contents in the bag, such as the brand name for the pet food therein if the bag 1700 contains pet food. Alternatively, or in addition, the printing or graphics on the panel 1707 may contain information such as price, composition, expiration date, and the like. In another embodiment, the panel 1707 may contain printing or graphics that provide a coupon or other price discount or other offer, either on the contents of the bag 1700 or some other product.

Those skilled in the art will understand and appreciate that the bag according to the invention may vary in size, dimensions, and shape without departing from the scope of the invention, and that the foregoing description of the preferred embodiments is not intended to limit the scope of the invention as defined by the claims. For example, those skilled in the art will understand and appreciate that the foregoing bag 1 or bag 100 can have sealed and sewn ends in a tubular bag with side gussets as shown, or a block bottom and top, or a combination thereof, although not shown. Those skilled in the art will also appreciate that a weakened portion or area can be provided in a number of ways that may vary from those expressly described and shown, such as by stressing portions of the bag wall with or without deforming, perforating, or cutting same, as well as varying the size, number, depth, and/or pattern of perforations, cuts, and/or deformations in a bag wall. Similarly, those skilled in the art will understand that the bag 1 may be provided with a re-usable opening (not shown) or a corner portion adapted to allow a person to easily pour the contents of the bag 1 out (not shown), or a combination of these two features. Such features are conventional with prior art bags. Similarly, those skilled in the art will appreciate that terms such as “front” and “rear,” and “top” and “bottom,” are useful in describing a bag, but essentially depend on a bag’s orientation when such terms are used, and are therefore not limiting as to a bag’s orientation.

I claim:

1. A bag comprising:

a first wall and a second wall, each of the first wall and second wall having an interior surface, an exterior surface, a top end and a bottom end, and comprising a first layer, a second layer, and a third layer, wherein the first layer comprises woven polymer strips, the second layer comprises a polymer film, and the third layer comprises a polymer film, wherein the first layer and the second layer are laminated together by the third layer, an easy open feature comprising perforations extending a distance of at least ten percent across both the first wall of the bag and the second wall of the bag, wherein the perforations are not located on the top end or bottom end of the bag, and wherein the perforations extend at least partially through the first layer, the second layer, or the third layer of the first wall and the second wall of the bag, and a cover covering a portion of the perforations, wherein said bag can be opened by pulling the cover from the perforations.

2. The bag according to claim 1, wherein the cover further comprises a pull tab at one end thereof, and the bag is adapted to be opened by pulling on the pull tab.

3. The bag according to claim 1, wherein each of the first layer, the second layer, and the third layer comprises the same polymer, and wherein the second layer or the third layer comprises printing thereon.

4. The bag according to claim 1, wherein the perforations further define a carat, a semi-circle, a curve, an open square, an open rectangle, a row, or a plurality of rows.

5. The bag according to claim 1, wherein the perforations extend between about 30% to about 70% of a distance across the first wall of the bag.

6. The bag according to claim 1, wherein the cover comprises a piece of tape.

7. The bag according to claim 1, wherein the top end and the bottom end are sealed to form the bag.

8. A bag comprising:

a front wall, a back wall, a first side wall, and a second side wall each having an interior surface, an exterior surface, a top end, and a bottom end, wherein each of the front wall, the back wall, the first side wall, and the second side wall comprises a first layer comprising woven strips comprising polyethylene, polypropylene, or a combination thereof and a second layer comprising a film comprising polyethylene, polypropylene, or a combination thereof, a plurality of perforations, wherein each of the perforations extend from the first side wall or second side wall onto the back wall, penetrates at least partially through at least one of the first layer or the second layer of the back wall and the first side wall or the second side wall, and not on the top end or bottom end of the bag; and a cover covering at least a portion of the plurality of perforations.

9. The bag according to claim 8, wherein each of the front wall, the back wall, the first side wall, and the second side wall further comprises a third layer comprising a film comprising polyethylene, polypropylene, or a combination thereof.

10. The bag according to claim 8, wherein the plurality of perforations are located only on the first side wall or the second side wall.

11. The bag according to claim 8, wherein the cover comprises a pull tab.

12. The bag according to claim 8, wherein the top end and the bottom end are sealed to form the bag, and the bag is adapted to hold at least ten pounds by weight of at least one filling material.

13. A bag comprising:

a front wall, a back wall, a first side wall, and a second side wall each having an interior surface, an exterior surface, a top end, and a bottom end, wherein each of the front wall, the back wall, the first side wall, and the second side wall comprises a first layer comprising woven strips comprising polyethylene, polypropylene, or a combination thereof and a second layer comprising a film comprising polyethylene, polypropylene, or a combination thereof, and wherein the first side wall and the back wall comprise a plurality of perforations, wherein each of the perforations penetrates at least partially through at least one of the first layer or the second layer, wherein the plurality of perforations extends from the first side wall onto the back wall, and not on the top end or bottom end of the bag, and wherein the bag further comprises a cover covering at least a portion of the plurality of perforations, wherein the cover comprises a pull tab.

14. The bag according to claim 13, wherein each of the front wall, the back wall, the first side wall, and the second side wall further comprises a third layer comprising a film comprising polyethylene, polypropylene, or a combination thereof, and wherein the second layer or the third layer comprises printing thereon.

15. The bag according to claim 13, wherein the plurality of perforations further extends onto the second side wall.

16. The bag according to claim 13, wherein the cover covers a middle portion of the plurality of perforations.

17. The bag according to claim 13, wherein the plurality of perforations extends from the first side wall onto the back wall and the second side wall.

18. The bag according to claim 13, wherein the plurality of perforations extends from the first side wall onto the back wall, the second side wall, and the front wall.

19. The bag according to claim 13, wherein the top end and the bottom end are sealed to form the bag.

20. The bag according to claim 13, wherein said bag is adapted to hold at least ten pounds by weight of at least one filling material.

* * * * *